United States Patent
Kanemasa

(10) Patent No.: US 8,531,984 B2
(45) Date of Patent: Sep. 10, 2013

(54) RECORDING MEDIUM STORING ANALYSIS PROGRAM, ANALYZING METHOD, AND ANALYZING APPARATUS

(75) Inventor: Yasuhiko Kanemasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 13/117,736

(22) Filed: May 27, 2011

(65) Prior Publication Data

US 2011/0307602 A1    Dec. 15, 2011

(30) Foreign Application Priority Data

Jun. 10, 2010  (JP) .................................. 2010-132992

(51) Int. Cl.
*H04L 12/28*    (2006.01)
*H04L 1/16*    (2006.01)

(52) U.S. Cl.
USPC .......................................... 370/252; 370/428

(58) Field of Classification Search
USPC ................................ 370/252, 428
See application file for complete search history.

(56) References Cited

U.S. PATENT DOCUMENTS 7,873,594 B2    1/2011    Harada et al.
2009/0122706 A1*  5/2009  Alfano et al. ................. 370/237

FOREIGN PATENT DOCUMENTS

JP    2006-011683    1/2006

* cited by examiner

*Primary Examiner* — John Pezzlo
(74) *Attorney, Agent, or Firm* — Fujitsu Patent Center

(57) ABSTRACT

An analyzing apparatus calculates a time-series change in an average process time per process of a server belonging to a first tier of a plurality of tiers and a time-series change in an average process time per process of a server belonging to a second tier of the plurality of tiers, referring to a storage unit that stores, with respect to each transaction executed in a multi-tier system in which a plurality of servers coordinate with each other to execute the transaction, information indicating periods in which the server in each of the plurality of tiers executes processes for the transaction. The apparatus determines the presence/absence of a correlation between the time-series change in the average process time of the server belonging to the first tier and the time-series change in the average process time of the server belonging to the second tier.

14 Claims, 28 Drawing Sheets

FIG. 7

```
                 120a        120b           120c           120d                                                                           120e                                    120f
                  ⌣          ⌣              ⌣             ⌣                                                                             ⌣                                      ⌣                  120g
                                                                                                                                                                                                    ⌣
1   ...
2   2009/09/07 01:58:19.987360 (132290-1) 194.185.39.24:51272 -> 194.23.6.226:10443 Request HTTP, POST /cgi-bin/AXXPF3943?__type=00168__zid=AXXG13130&__sid=LigkVcFasr8A&__uid=1192
3   2009/09/07 01:58:20.057275 (132291-28991) 194.23.6.226:39931 -> 194.23.7.168:8802 Request IIOP,AXXG13130/INF/H01
4   2009/09/07 01:58:20.120100 (131268-309) 194.23.7.168:52245 -> 194.23.8.198:1521 Request DB, select name into :b0 from customer where (b_id=TO_NUMBER(:b1) and a_number=TO_NUMBER(:b2))
5   2009/09/07 01:58:20.225221 (131268-309) 194.23.7.168:52245 <- 194.23.8.198:1521 Response DB,16
6   2009/09/07 01:58:20.321154 (131268-310) 194.23.7.168:52245 -> 194.23.8.198:1521 Request DB, select TO_CHAR(last_update,'YYYY/MM/DD HH24:MI:SS') into :b0 from access_log where (b_id=TO_NUMBER(:b1) and a_number=TO_NUMBER(:b2))
7   2009/09/07 01:58:20.357440 (132292-1) 194.185.39.25:51272 -> 194.23.6.226:10443 Request HTTP, POST /cgi-bin/AXXPF3943?__type=00168__zid=XXX&__sid=YYY&__uid=ZZZ
8   2009/09/07 01:58:20.411225 (132293-28991) 194.23.6.226:39931 -> 194.23.7.168:8802 Request IIOP,XXX/INF/H00
9   2009/09/07 01:58:20.498217 (131270-288) 194.23.7.168:52245 -> 194.23.8.198:1521 Request DB,select 1 into :b0 from DUAL
    2009/09/07 01:58:20.560519 (131268-310) 194.23.7.168:52245 <- 194.23.8.198:1521 Response DB,16
    ...
```
⌣
120

```
 …
10  2009/09/07 01:58:20.793477 (131268-311) 194.23.7.168:52245 -> 194.23.8.198:1521 Request DB,
    select b.name ,NVL(TO_CHAR(b.last_logon_time,'YYYY/MM/DD HH24:MI:SS'),' ') into :b0,:b1
    from account a ,customer b  where (((b.b_id=a.b_id and b.a_number=a.a_number)
    and b.b_id=TO_NUMBER(:b2)) and b.a_number=TO_NUMBER(:b3))
11  2009/09/07 01:58:20.801116 (131270-288) 194.23.7.168:52245 <- 194.23.8.198:1521 Response DB,16
12  2009/09/07 01:58:20.887172 (131270-289) 194.23.7.168:52245 -> 194.23.8.198:1521 Request DB,DATA
13  2009/09/07 01:58:20.991166 (131268-311) 194.23.7.168:52245 <- 194.23.8.198:1521 Response DB,16
14  2009/09/07 01:58:21.121019 (131268-312) 194.23.7.168:52245 -> 194.23.8.198:1521 Request DB,
    update access_log set last_update=TO_DATE(:b0,'YYYY/MM/DD HH24:MI:SS')
    where (b_id=TO_NUMBER(:b1) and a_number=TO_NUMBER(:b2))
15  2009/09/07 01:58:21.210316 (131268-312) 194.23.7.168:52245 <- 194.23.8.198:1521 Response DB,8
16  2009/09/07 01:58:21.220433 (131268-312) 194.23.7.168:52245 <- 194.23.8.198:1521 Response DB,6
17  2009/09/07 01:58:21.299258 (132291-28991) 194.23.6.226:39931 -> 194.23.6.226:51272 Response IIOP,0
18  2009/09/07 01:58:21.330431 (132290-1) 194.185.39.24:51272 <- 194.23.6.226:10443 Response HTTP,200
19  2009/09/07 01:58:21.412452 (132293-28991) 194.23.6.226:39931 <- 194.23.6.226:8002 Response IIOP,0
20  2009/09/07 01:58:21.533387 (132292-1) 194.185.39.25:51272 <- 194.23.6.226:10443 Response HTTP,200
 …
```

FIG. 15

| TIER | SEGMENT | AVERAGE PROCESS TIME (SEC) |
|---|---|---|
| TIER 1 | BEFORE START OF QUERY | 0.000232 |
| TIER 1 | AFTER COMPLETION OF QUERY | 0.000189 |
| TIER 2 | BEFORE START OF QUERY | 0.000682 |
| TIER 2 | DURING MULTIPLE QUERIES | 0.000430 |
| TIER 2 | AFTER COMPLETION OF QUERY | 0.000842 |
| TIER 3 | OVERALL PROCESS TIME | 0.000917 |

[AVERAGE PROCESS TIME IN NORMAL STATE]
TIME: 1 TO 2 MINUTE
TIME: 0 TO 1 MINUTE
TIME: 0 TO 14 MINUTE 152a
152c

FIG. 17

[CORRELATION COEFFICIENT IN NORMAL STATE] 152d

| UPPER TIER | LOWER TIER | CORRELATION COEFFICIENT |
|---|---|---|
| TIER 1: AFTER COMPLETION OF QUERY | TIER 2: DURING MULTIPLE QUERIES | 0.256 |
| TIER 1: AFTER COMPLETION OF QUERY | TIER 3: OVERALL PROCESS TIME | 0.231 |
| TIER 2: DURING MULTIPLE QUERIES | TIER 3: OVERALL PROCESS TIME | 0.448 |

[AVRAGE PROCESS TIME IN ABNROMAL STATE]

TIME: 1 TO 2 MINUTE
TIME: 0 TO 1 MINUTE
TIME: 0 TO 14 MINUTE

| TIER | SEGMENT | AVERAGE PROCESS TIME (SEC) | RATE OF INCREASE |
|---|---|---|---|
| TIER 1 | BEFORE START OF QUERY | 0.000240 | 0.000240 |
| TIER 1 | AFTER COMPLETION OF QUERY | 0.000204 | 0.000204 |
| TIER 2 | BEFORE START OF QUERY | 0.003273 | 0.003273 |
| TIER 2 | DURING MULTIPLE QUERIES | 0.001577 | 0.001577 |
| TIER 2 | AFTER COMPLETION OF QUERY | 0.002432 | 0.002432 |
| TIER 3 | OVERALL PROCESS TIME | 0.002967 | 0.002967 |

FIG. 20

| | | 153b |
|---|---|---|
| | [CORRELATION COEFFICIENT IN ABNORMAL STATE] | |

| UPPR TIER | LOWER TIER | CORRELATION COEFFICIENT |
|---|---|---|
| TIER 2: DURING MULTIPLE QUERIES | TIER 3: OVERALL RPOCESS TIME | 0.986 |

153d

RECORDING MEDIUM STORING ANALYSIS PROGRAM, ANALYZING METHOD, AND ANALYZING APPARATUS

CROSS-REFERENCE TO RELATED APPLICATIONS

This application is based upon and claims the benefit of priority of the prior Japanese Patent Application No. 2010-132992, filed on Jun. 10, 2010, the entire contents of which are incorporated herein by reference.

FIELD

The embodiments discussed herein are related to a recording medium storing analysis program, analyzing method, and analyzing apparatus.

BACKGROUND

An information processing system (hereinafter referred to as a "multi-tier system") in which multiple computers hierarchically share a process has been available. The computers included in the multi-tier system may hereinafter be referred to as "servers". One known example of the multi-tier system is a three-tier system including a web server that provides an interface for use of the system, an app (application) server for executing a process in the system, and a DB (database) server for managing data. In response to a process request from a user, the servers coordinate with each other to execute a process and make a response to the process request. Causing the servers to share the process makes it possible to improve the system reliability and the response capability.

In such a multi-tier system typified by a web multi-tier system, when a response time at the end user increases, specifying a tier to which the server having a problem belongs, is very important as the first step toward addressing a failure. Therefore, a scheme in which the process times of the servers in the tiers are measured and changes in the process times are measured has been widely used to determine the presence/absence of a problem.

One conceivable technology is that a transaction model is generated and message exchange that is carried out in accordance with the transaction model is detected from messages transmitted/received via a switch. The technology makes it possible to specify a collection of messages that constitute an arbitrary transaction and also makes it possible to analyze the transaction. For example, it is possible to keep track of processes of each application from when a user request is issued until a response is made.

However, although increases in the process times of the individual servers in the tiers can be detected through analysis of the process times of the servers, the method of the related art is in some cases insufficient for quickly specifying a portion that causes a problem, such as a process delay.

For example, the process times of the servers in multiple tiers may increase simultaneously. Causes of such increases in the process times can be attributed to, for example, two patterns as described below.

The first pattern corresponds to a case in which problems such as overloading occur independently in the servers in the different tiers. The second pattern corresponds to a case in which only the server in the lower tier has a problem and the server in the upper tier is merely influenced by an increase in the process time of the server in the lower tier. With the technology of the related art, however, such two patterns cannot be distinguished from each other. As a result, when increases in the process times of the servers in the multiple tiers are detected, the servers in the tiers are individually checked for cause determination. This requires a large amount of time for the cause termination and measures therefor.

SUMMARY

According to an aspect of the invention, an analyzing apparatus calculates a time-series change in an average process time per process of a server belonging to a first tier of a plurality of tiers and a time-series change in an average process time per process of a server belonging to a second tier of the plurality of tiers, referring to a storage unit that stores, with respect to each transaction executed in a multi-tier system in which a plurality of servers coordinate with each other to execute the transaction, information indicating periods in which the server in each of the plurality of tiers executes processes for the transaction. The apparatus determines the presence/absence of a correlation between the time-series change in the average process time of the server belonging to the first tier and the time-series change in the average process time of the server belonging to the second tier.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed

BRIEF DESCRIPTION OF THE DRAWINGS

FIG. 7 illustrates a first part of an example of messages stored in a message storage unit;

FIG. 8 illustrates a second part of the example of messages stored in the message storage unit;

FIG. 15 illustrates one example of the data structure of a normal-state process-time storage unit;

FIG. 17 illustrates one example of the data structure of a normal-state correlation-coefficient storage unit;

FIG. 18 illustrates one example of the data structure of an abnormal-state process-time storage unit;

FIG. 20 illustrates one example of the data structure of an abnormal-state correlation-coefficient storage unit;

DESCRIPTION OF EMBODIMENTS

Embodiments will be described below with reference to the accompanying drawings.

First Embodiment

Figure 1:
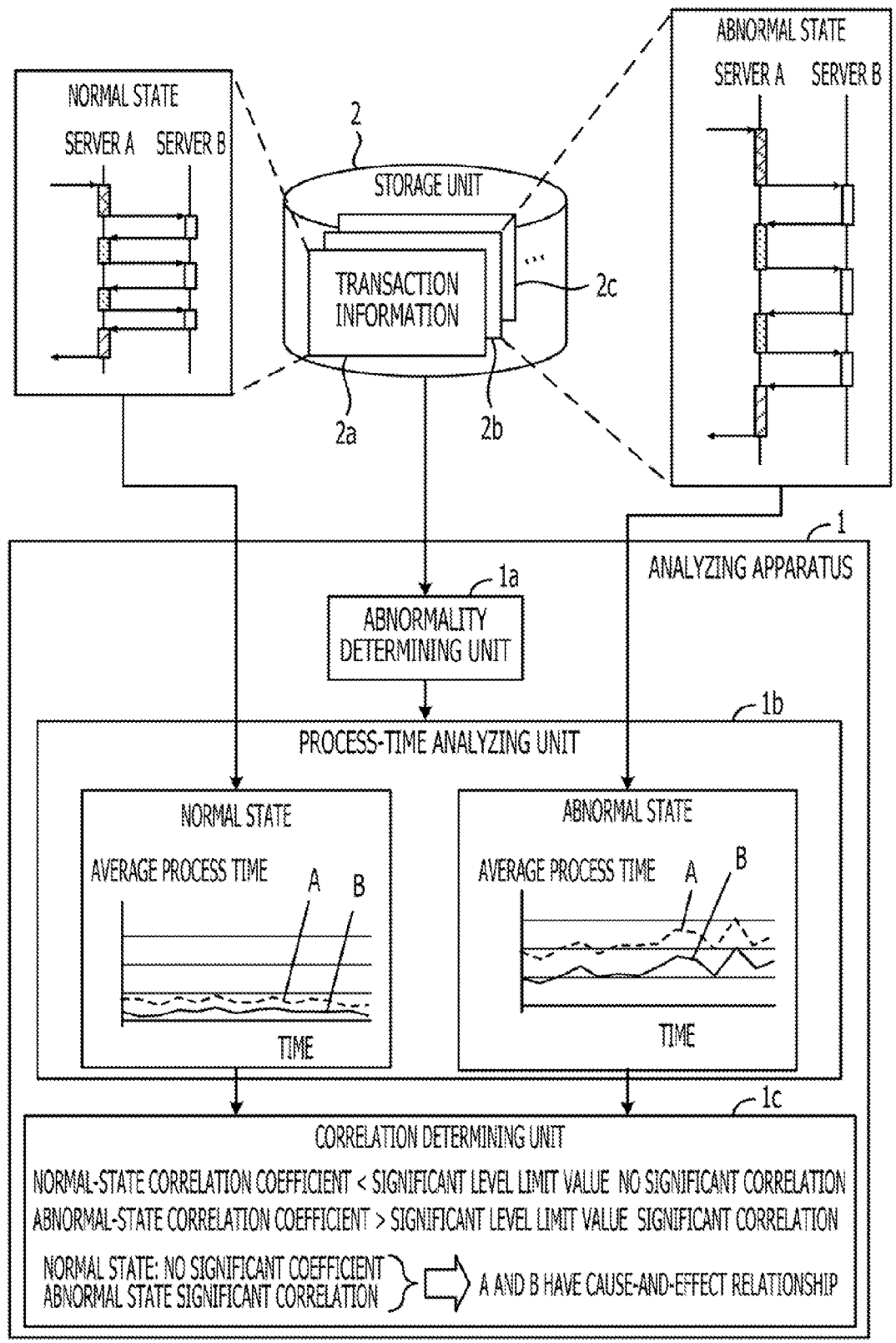
FIG. 1 is a block diagram illustrating a function of an analyzing apparatus according to a first embodiment.

FIG. 1 is a block diagram illustrating a function of an analyzing apparatus according to a first embodiment. An analyzing apparatus 1 according to a first embodiment performs analysis processing by referring to information stored in a storage unit 2.

The storage unit 2 stores multiple pieces of transaction information 2a, 2b, and 2c regarding transactions executed in a multi-tier system in which two or more servers coordinate with each other to execute transactions. The pieces of transaction information 2a, 2b, and 2c include information indicating periods in which the servers in individual tiers execute processes regarding corresponding transactions. For example, each piece of the transaction information includes messages communicated between the servers in the transaction and the time at which each message is communicated. In this case, the communication time of the message is used to indicate a period of time in which the server in each tier executes a process for the transaction. The period in which the server executes a process corresponds to a period from when the server receives a message in the transaction until the server transmits a next message.

The analyzing apparatus 1 has an abnormality determining unit 1a, a process-time analyzing unit 1b, and a correlation determining unit 1c to implement an analyzing function using the transaction information.

The abnormality determining unit 1a refers to the storage unit 2 to determine the presence/absence of an abnormality in the multi-tier system. For example, the abnormality determining unit 1a determines the presence/absence of an abnormality in the multi-tier system on the basis of the time from when the server in the highest tier receives a process request until the server transmits a response. In this case, for example, when an average of elapsed times from when the server in the highest tier receives process requests in corresponding transactions executed in a specified period of time until the server in the highest tier transmits responses is larger than or equal to a preset threshold, the abnormality determining unit 1a determines that the specified period is a period in which an abnormality is detected. Hereinafter, the period in which an abnormality is detected is referred to as an "abnormal state" and the period in which no abnormality is detected is referred to as a "normal state".

On the basis of the transaction information, the process-time analyzing unit 1b calculates a time-series change in the average process time per process of a server belonging to a first tier and a time-series change in the average process time per process of a server belonging to a second tier. In the example of FIG. 1, the time-series changes in the average process time per process are calculated with respect to a server A and a server B. The process-time analyzing unit 1b individually calculates the time-series change in the normal state and the time-series change in the abnormal state. For example, on the basis of the transaction information in the normal state, the process-time analyzing unit 1b calculates a time-series change in the average process time per process of the server belonging to the first tier and a time-series change in the average process time per process of the server belonging to the second tier. On the basis of the transaction information in the abnormal state, the process-time analyzing unit 1b calculates a time-series change in the average process time per process of the server belonging to the first tier and a time-series change in the average process time per process of the server belonging to the second tier.

The process-time analyzing unit 1b determines the first tier and the second tier in a manner described below. For example, the process-time analyzing unit 1b refers to the storage unit 2. The process-time analyzing unit 1b then determines whether or not the average process time per process of the server belonging to each tier in the abnormal state has increased by a specified value or more than an average process time per process in the normal state. The process-time analyzing unit 1b then determines, as the first tier and the second tier, two tiers in which the process times have increased by the specified value or more.

The correlation determining unit 1c determines the presence/absence of a correlation between the time-series change in the average process time of the server belonging to the first tier and the time-series change in the average process time of the server belonging to the second tier. For example, the correlation determining unit 1c calculates a correlation coefficient for a correlation between the time-series change in the average process time per process of the server belonging to the first tier and the time-series change in the average process time per process of the server belonging to the second tier. When the correlation coefficient is larger than or equal to a limit value for a specified significant level, the determining unit 1c determines that the time-series changes are correlated with each other.

The correlation determining unit 1c may individually determine the presence/absence of a correlation in the normal state and the presence/absence of a correlation in the abnormal state. That is, the correlation determining unit 1c obtains the normal-state time-series change calculated by the process-time analyzing unit 1b. The correlation determining unit 1c then determines the presence/absence of a correlation between the time-series change in the average process time of the server belonging to the first tier in the normal state and the time-series change in the average process time of the server belonging to the second tier in the normal state. The correlation determining unit 1c also obtains the abnormal-state time-series change from the process-time analyzing unit 1b. The correlation determining unit 1c then determines the presence/absence of a correlation between the time-series change in the average process time of the server belonging to the first tier in the abnormal state and the time-series change in the average process time of the server belonging to the second tier in the abnormal state.

Upon individually determining the presence/absence of a correlation in the normal state and the presence/absence of a correlation in the abnormal state, the correlation determining unit 1c determines whether or not the servers in the different tiers have a cause-and-effect relationship in an increase in the process time per process. For example, upon determining that there is a correlation in the abnormal state and there is no correlation in the normal state, the correlation determining unit 1c determines that there is a cause-and-effect relationship in an increase in the process time.

The analyzing apparatus 1 having a function as described above determines whether or not an influence of a change in the process time propagates between the servers in the different tiers in the multi-tier system. When the influence propagates, there is a possibility that, during occurrence of an abnormality such as an in crease in the process time, simply reducing or eliminating the cause of an abnormality in the server belonging to one of the tiers having a cause-and-effect relationship reduces or eliminates an abnormality in the entire system. In such a case, there is no need to search for the cause of an abnormality in the server in the other one of the tiers having the cause-and-effect relationship, thus improving the work efficiency of the abnormality analysis.

The presence/absence of a cause-and-effect relationship is determined in the example of FIG. 1, and an administrator can readily recognize the possibility of propagation of an influence by using the analyzing apparatus 1 to merely make a determination as to the presence/absence of a correlation in a specified period without making a distinction between the normal state and the abnormal state. For example, the administrator stores, in the storage unit 2, only the transaction information obtained in the period in which some kind of abnormality was detected in the multi-tier system. Thereafter, the administrator uses the analyzing apparatus 1 to determine a correlation in the process time between the servers, on the basis of the transaction information obtained in the period in which the abnormality was detected. When the administrator performs such work, it is possible to determine a correlation in the process time between the servers in the abnormal state, without provision of the abnormality determining unit 1a in the analyzing apparatus 1. When a significant correlation is found at least in the abnormal state, the administrator can recognize that there is a possibility that an influence propagates between the servers.

The analyzing apparatus 1 illustrated in FIG. 1 determines not only the presence/absence of a significant correlation but also the presence/absence of a cause-and-effect relationship. Since the presence/absence of a cause-and-effect relationship is also determined, even an administrator who is not sufficiently experienced in the failure analysis can also adequately determine whether or not the servers have a cause-and-effect relationship in an increase in the process time. Thus, it is possible to improve the efficiency of work involved in reduction or elimination of an abnormal state.

That is, the use of the analyzing apparatus 1 illustrated in FIG. 1 makes it possible to recognize, when process times in two tiers increase simultaneously, whether both of the tiers have problems or whether one of the tiers has a problem affecting the other. When it is found that the servers in the different tiers have a cause-and-effect relationship in the process time, it is possible to estimate a direction of the cause-and-effect relationship (i.e., which server acts as a cause and which server acts as an effect). For example, in the case of the multi-tier system, the server in the lower tier generally affects the server in the upper tier. Accordingly, when the multi-tier system has an abnormality, the administrator can understand that it is suffice to check only the server in the lower one of the tiers having a cause-and-effect relationship. Thus, the work efficiency improves. Conversely, when the presence/absence of a cause-and-effect relationship cannot be determined, the administrator may miscomprehend that both of the tiers have causes and thus may carry on the checking. As a result, an excessive amount of time may be taken to check both of the tiers, an unnecessary purchase of hardware for both of the tiers may be made for replacement, or cause analysis may be disrupted to result in a failure of determination of a problem cause, thereby reducing the work efficiency.

In the multi-tier system, the server belonging to the first tier or the server belonging to the second tier may output a process request to the server in the lower tier during execution of a process corresponding to a process request from the server in the higher tier. In such a case, the process-time analyzing unit 1b may classify the execution period of each process into a corresponding one of multiple types in accordance with to communication that triggers the start of the processing and a communication that is performed at the end of the process. When the execution period of each process is classified into multiple types, the process-time analyzing unit 1b selects at least one type from the multiple types. The process-time analyzing unit 1b then sets the average of the process times in execution periods of processes belonging to the at least one selected type as an average process time per process of the server belonging to the first tier or the server belonging to the second tier.

When the process is classified into multiple types of execution period, the process-time analyzing unit 1b classifies the process into, for example, three types of execution period as described below.

A first type of execution period is a period to which an execution period of a process that is triggered by a process request input from the server in the upper tier and that is ended upon output of a process request to the server in the lower tier belongs. A second type of execution period is a period to which an execution period of a process that is triggered by a response transmitted from the server in the lower tier in response to a process request output to the server in the lower tier and that is ended upon output of a process request to the server in the lower tier belongs. A third type of execution period is a period to which an execution period of a process that is triggered by a response transmitted from the server in the lower tier in response to a process request output to the server in the lower tier and that is ended upon output of a response to the server in the upper tier belongs.

With the classification of execution periods of processes into the first type to the third type, for example, when an execution period belonging to the second type exists, the process-time analyzing unit 1b selects the second type with priority. Thus, the process-time analyzing unit 1b sets the average of the process times of execution periods of processes belonging to the second type as the average process time per process of the server belonging to the first tier or the server belonging to the second tier. This is because the second type is less susceptible to the time for waiting for a connection to be established with the server in another tier and thus the state of the processing load of the server appears accurately as a process time.

When a specific condition is satisfied, the correlation determining unit 1c also determines the presence/absence of a cause-and-effect relationship without using the time-series changes in the process times. For example, there are cases in which, in the upper one of the first and second tiers, the average process time of the execution times belonging to the first type increases by a specified value or more and the average process time of the execution times belonging to the second type and the third type do not increase by the specified amount or more. In such cases, the correlation determining unit 1c determines whether or not there is a cause-and-effect relationship between an increase in the process time in the upper tier and an increase in the process time in the lower tier. In this case, it is possible to identify a portion where a cause is generated and a portion affected by the cause, in addition to the presence/absence of a cause-and-effect relationship. That is, the correlation determining unit 1c determines that the increase in the process time in the upper tier is caused by propagation of an influence in the increase in the process time in the lower tier.

Second Embodiment

A second embodiment will be described below in detail with reference to the accompanying drawings. In the second embodiment, packets transmitted over a network are captured and the captured packets are used for analysis.

In the second embodiment, a three-tier web system will be described as an example of a multi-tier system. The three-tier web system is a multi-tier system that includes a web server, an application server (hereinafter referred to as an "app server"), and a database server (hereinafter referred to as a "DB server"). The web server receives, in the form of packets according to an HTTP (hyper text transfer protocol), a process request output from a browser on a computer of an end user. When the process request is to obtain static content, the web server directly transmits corresponding held content to the computer of the end user. When the process request is to obtain dynamic content generated by a program, the web server issues a request for the process thereof to the app server. Upon receiving the request for the process, the app server executes the process request by using a program written in Java® or the like. During execution of the process, the app server issues a process request for data to be used to the DB server holding the data and obtains the data.

In such a three-tier web system, for example, the times taken for the app server and the DB server to perform a process for one transaction may increase simultaneously. In this case, the increase in the process time of the app server is due to propagation of an influence of the increase in the process time of the DB server, and elimination of a problem occurring in the DB server may lead to a decrease in the process time of the app server. When such an influence propagation relationship is known in advance, it is possible to promptly take measures when an abnormality due to an increase in the process time occurs.

Figure 2:
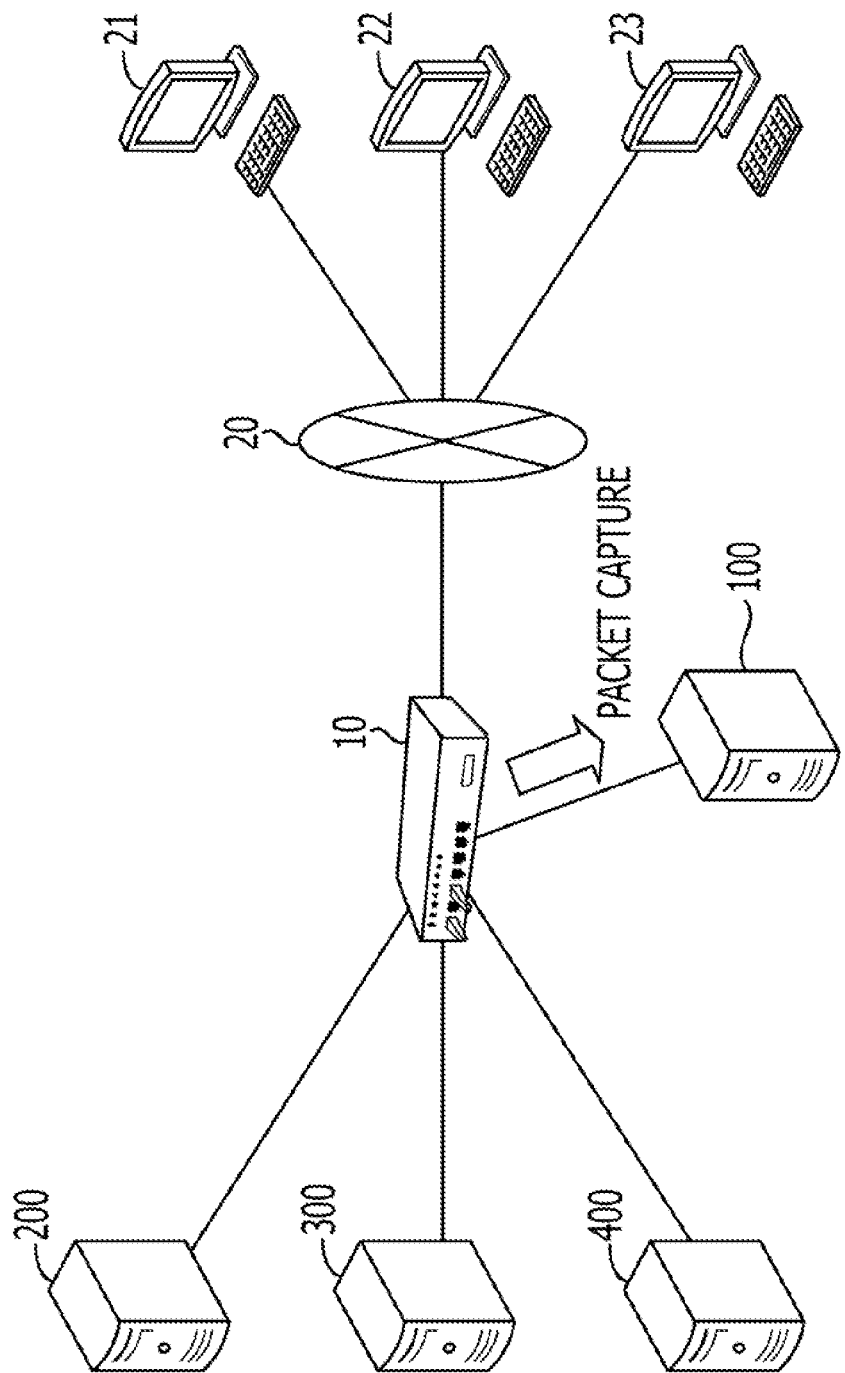
FIG. 2 is a diagram illustrating an overall configuration of a task system according to a second embodiment.

FIG. 2 is a diagram illustrating an overall configuration of a task system according to the second embodiment. The task system includes an operation management server 100, a web server 200, an app server 300, and a DB server 400. The operation management server 100, the web server 200, the app server 300, and the DB server 400 are interconnected via a switch device 10. The switch device 10 is also connected to terminal apparatuses 21, 22, and 23 through a network 20.

The terminal apparatuses 21, 22, and 23 are capable of accessing the web server 200 through the network 20 and the switch device 10. The users of the terminal apparatuses 21, 22, and 23 use the task system by operating GUIs (graphical user interfaces), provided by the web server 200, on the terminal apparatuses 21, 22 and 23. The network 20 is, for example, an intranet.

The network 20 may also be the Internet. In this case, the switch device 10 may also have a firewall function. A network segment to which the web server 200 belongs is handled as, for example, a DMZ (Demilitarized Zone).

The operation management server 100 monitors the operating states of the web server 200, the app server 300, and the DB server 400. The operation management server 100 obtains, from the switch device 10, information for the operating-state management. That is, the switch device 10 has a port mirroring function and transmits communication packets, transmitted/received between the web server 200, the app server 300, and the DB server 400, to the operation management server 100. The port mirroring function refers to a function for copying IP packets flowing through a port included in the switch device 10 and transferring the copied IP packets to another specified port. The operation management server 100 is provided at an opposite end of the port specified as the transfer destination, to record and analyze the IP packets.

The operation management server 100 receives communication packets transmitted from the switch device 10 and stores the received communication packets (packet capture). For an application in which the operation management server 100 merely performs packet capture, the switch device 10 may be replaced with a repeater hub. The operation management server 100 has a network interface that receives the IP packets transferred. The operation management server 100 has a hard disk with a capacity that is large enough to store the transferred IP packets. It is desirable that the operation management server 100 further have a CPU (central processing unit) capability that is sufficient to capture the IP packets. The transferred IP packets are captured by the operation management server 100 and are then subjected to processing for extracting a message flow.

The web server 200 receives process requests (messages) issued from the web browsers running on the terminal apparatuses 21, 22, and 23 to the task system. In this case, the web server 200 and the terminal apparatuses 21, 22, and 23 are assumed to exchange the messages according to the HTTP (hypertext transfer protocol). Another protocol may also be used.

The process requests transmitted from the terminal apparatuses 21, 22, and 23 to the web server 200 are hereinafter referred to as "HTTP requests". Responses to the HTTP requests are also referred to as "HTTP responses". The requests and responses are examples of the process requests.

On the basis of the HTTP requests received from the terminal apparatuses 21, 22, and 23, the web server 200 generates HTTP responses with respect to static content and transmits the HTTP responses to the terminal apparatuses 21, 22, and 23. With respect to dynamic content, the web server 200 generates a process request (message) for a process that the app server 300 is to be requested to execute and then transmits the process request to the app server 300.

In this case, the web server 200 and the app server 300 are assumed to exchange the messages according to an IIOP (Internet Inter-ORB (Object Request Broker) Protocol). Another protocol may also be used.

Hereinafter, the process request transmitted from the web server 200 to the app server 300 is referred to as an "IIOP request". A response to the IIOP request is also referred to as an "IIOP response".

Upon receiving the IIOP response to the IIOP request, the web server 200 generates an HTTP response on the basis of the contents of the IIOP response and transmits the HTTP response to the terminal apparatuses 21, 22, and 23.

On the basis of the IIOP request received from the web server 200, the app server 300 generates a query for a process that the DB server 400 is to be requested to execute and then transmits the query to the DB server 400.

The query generated by the app server 300 is written in, for example, an SQL (structured query language) statement. Hereinafter, the query transmitted from the app server 300 to the DB server 400 is referred to as a "DB request". A response to the DB request is also referred to as a "DB response".

Upon receiving the DB response to the DB request, the app server 300 generates an IIOP response on the basis of the contents of the DB response and transmits the IIOP response to the web server 200.

The DB server 400 executes the SQL statement, included in the DB request received from the app server 300, to execute a process, such as reference and update, on the DB. The DB server 400 generates a DB response on the basis of a result of the process and transmits the DB response to the app server 300.

Although a configuration in which the task system includes one web server 200, one app server 300, one DB server 400, and corresponding tiers (a web tier, an app tier, and a DB tier) has been described by way of example, multiple servers may also be provided in each tier. When multiple servers are provided in each tier, load distribution processing is performed in each tier.

While some schemes are conceivable to obtain messages transmitted/received across multiple tiers, it is assumed that, in the second embodiment, information is obtained from IP packets flowing through the network. In this case, the switch device 10 having the port mirroring function is used.

The term "servers" hereinafter refer to the web server 200, the app server 300, and the DB server 400. In addition, the web server 200 is assumed to be a server in a higher tier than those of the app server 300 and the DB server 400. The app server 300 is also assumed to be a server in a higher tier than the tier of the DB server 400. Information that defines such a tier relationship is pre-stored in the operation management server 100.

Figure 3:
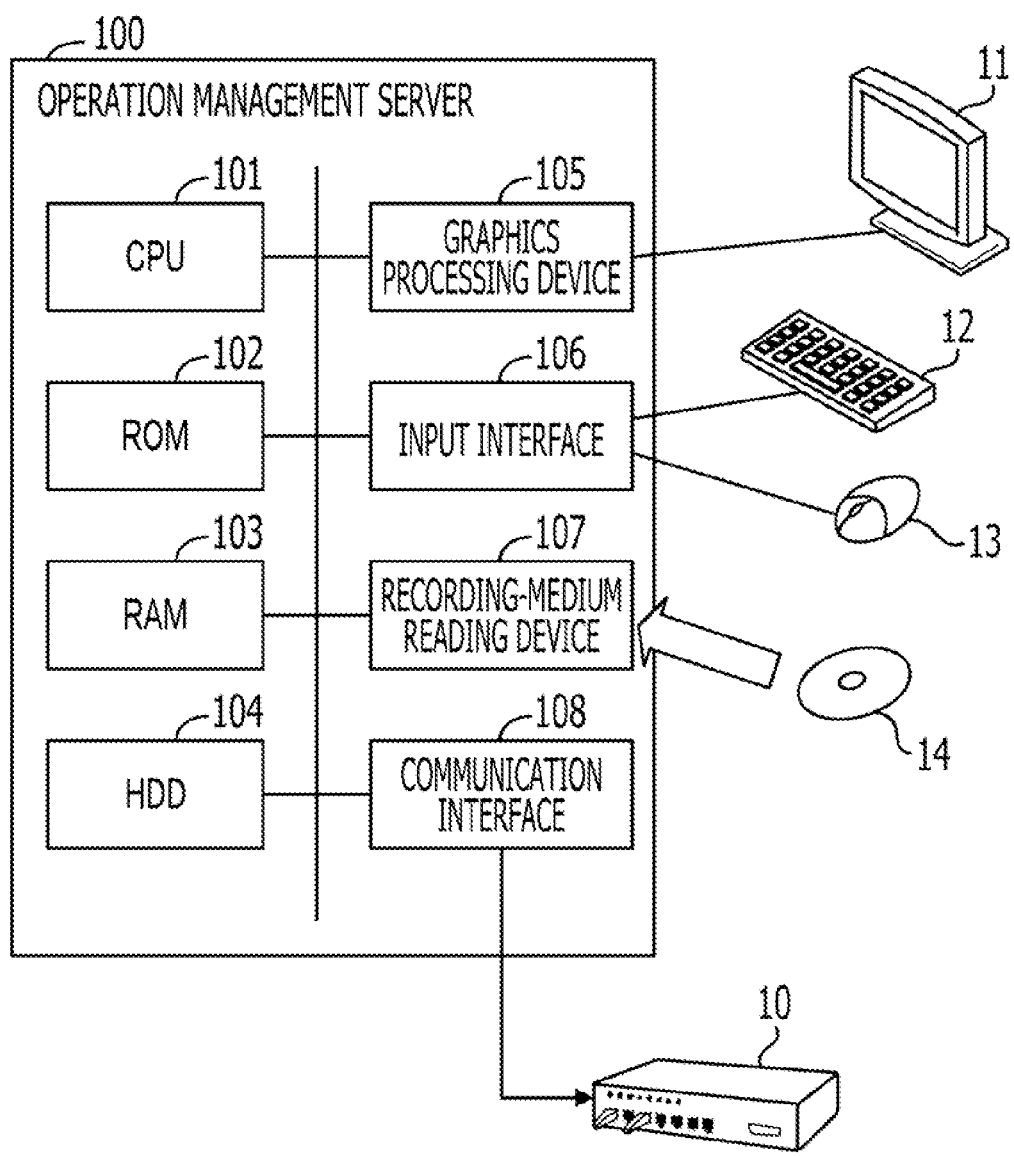
FIG. 3 illustrates the hardware configuration of an operation management server in the second embodiment.

FIG. 3 illustrates the hardware configuration of the operation management server in the second embodiment. The operation management server 100 includes a CPU 101, a ROM (read only memory) 102, a RAM (random access memory) 103, a HDD (hard disk drive) 104, a graphics processing device 105, an input interface 106, a recording-medium reading device 107, and a communication interface 108.

The CPU 101 controls the entire operation management server 100.

The ROM 102 stores, for example, a BIOS (basic input/output system) program on the operation management server 100.

The RAM 103 temporarily stores at least part of an OS (operating system) program and application programs to be executed by the CPU 101. The RAM 103 stores various types of data needed for processing to be executed by the CPU 101.

The HDD 104 stores the OS program and the application programs. The HDD 104 also stores various types of data needed for processing to be executed by the CPU 101.

Another type of storage device, such as an SSD (solid state drive) may be used in place of the HDD 104 (or in conjunction with the HDD 104).

The graphics processing device 105 is coupled to a monitor 11. In accordance with an instruction from the CPU 101, the graphics processing device 105 displays an image on a screen of the monitor 11.

A keyboard 12 and a mouse 13 are coupled to the input interface 106. The input interface 106 sends signals, transmitted from the keyboard 12 and the mouse 13, to the CPU 101.

The recording-medium reading device 107 reads data stored on a recording medium 14. For example, a function to be implemented by the operation management server 100 is accomplished by using a computer to realize a program stating the processing details of the function. Such a program may be recorded on a computer readable recording medium 14 for distribution. The program may also be stored in a program distribution server (not illustrated) coupled to the switch device 10 or the network 20. In this case, the operation management server 100 downloads a program from the program distribution server through the switch device 10 or the network 20.

The recording medium 14 may be implemented by, for example, a magnetic recording device, an optical disk, an magneto-optical recording medium, or a semiconductor memory. Examples of the magnetic recording device include a HDD, a flexible disk (FD), and a magnetic tape. Examples of the optical disk include a CD (compact disc), a CD-R/RW (Recordable/ReWritable), DVD (digital versatile disc), and a DVD-R/RW/RAM. One example of the magneto-optical recording medium is an MO (magneto-optical) disk. Examples of the semiconductor memory include a flash memory, such as a USB (universal serial bus) memory.

The communication interface 108 is coupled to the switch device 10 through a TP (twisted pair) cable, an optical cable, or the like. The communication interface 108 performs data communication with another information processing apparatus through the switch device 10. The communication interface 108 receives communication packets, transmitted/received between the servers, from the switch device 10.

The web server 200, the app server 300, the DB server 400, and the terminal apparatuses 21, 22, and 23 may also be implemented by a hardware configuration that is substantially similar to that of the operation management server 100.

Figure 4:
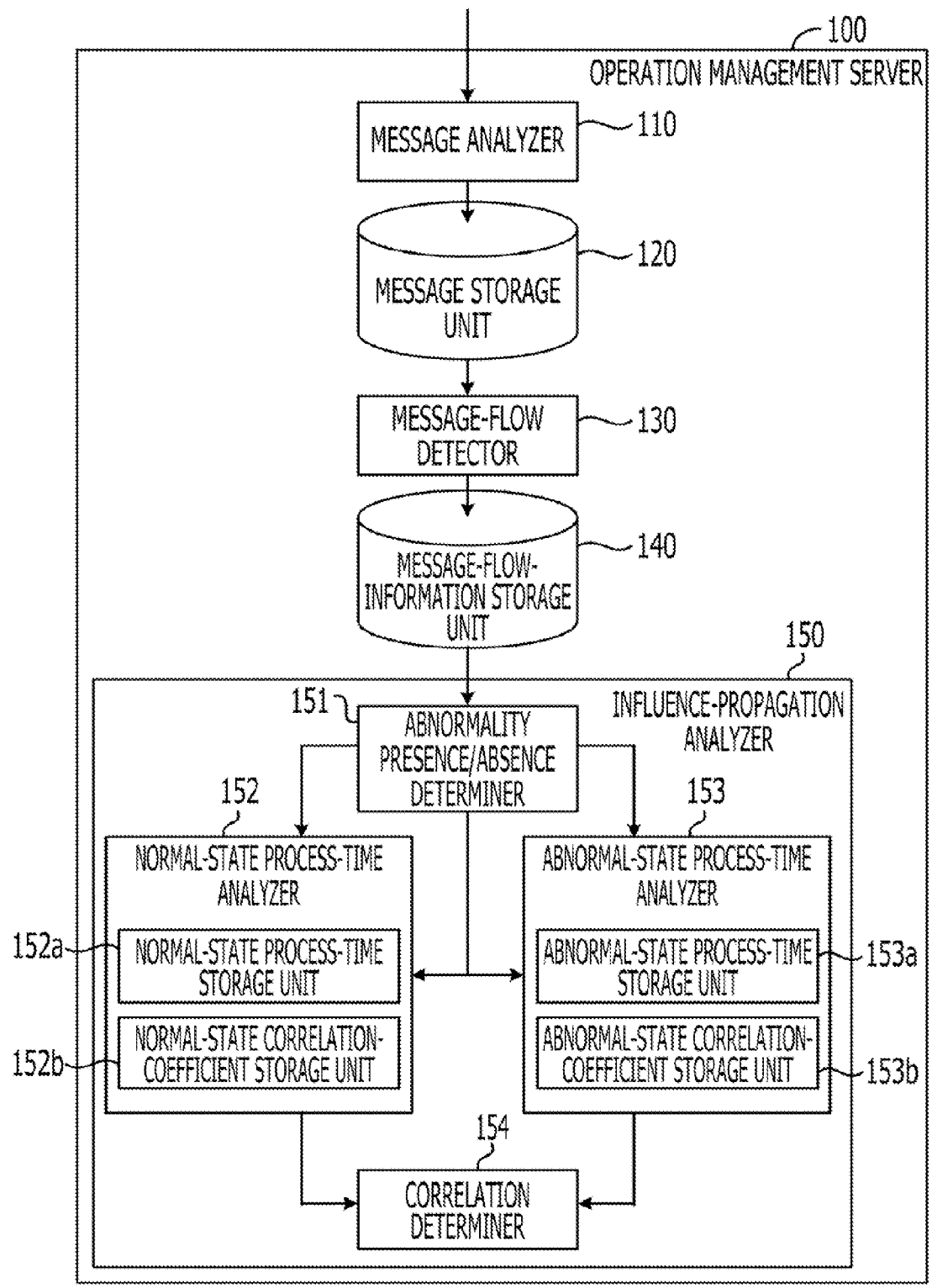
FIG. 4 is a block diagram illustrating the functional configuration of the operation management server in the second embodiment.

FIG. 4 is a block diagram illustrating the functional configuration of the operation management server in the second embodiment. The operation management server 100 includes a message analyzer 110, a message storage unit 120, a message-flow detector 130, a message-flow-information storage unit 140, and an influence-propagation analyzer 150.

The message analyzer 110 receives communication packets, transmitted/received via the switch device 10, from the switch device 10. The message analyzer 110 analyzes the received packets and reconstructs messages communicated between the web server 200, the app server 300, the DB server 400, and the terminal apparatuses 21, 22, and 23. The message analyzer 110 causes the reconstructed messages to be stored in the message storage unit 120.

The message storage unit 120 stores the reconstructed messages. For example, part of the storage area in the RAM 103 or the HDD 104 is used as the message storage unit 120.

The message-flow detector 130 detects, from the messages stored in the message storage unit 120, a message flow of a transaction (a series of processes) executed by the web server 200, the app server 300, and the DB server 400. For example, the message-flow detector 130 has a message flow model and extracts, from the message storage unit 120, a combination of messages that match the message flow model. The message-flow detector 130 causes the combination of the messages that match the message flow model to be stored in the message-flow-information storage unit 140 as message flow information.

The message-flow-information storage unit 140 stores the message flow information. For example, part of the storage area in the RAM 103 or the HDD 104 is used as the message-flow-information storage unit 140.

On the basis of the message flow information stored in the message-flow-information storage unit 140, the influence-propagation analyzer 150 analyzes whether or not an influence propagates between the servers in the different tiers. To this end, the influence-propagation analyzer 150 has an abnormality presence/absence determiner 151, a normal-state process-time analyzer 152, an abnormal-state process-time analyzer 153, and a correlation determiner 154.

The abnormality presence/absence determiner 151 determines the presence/absence of an abnormality on the basis of the message flow information stored in the message-flow-information storage unit 140. For example, the abnormality presence/absence determiner 151 calculates a time (a process time) from when a request message for the server (the web server 200) in the highest tier, the request message being indicated in the message flow information, is input until a response message is output from the server. When the average of the process times of the message flow is greater than or equal to a specified time, the abnormality presence/absence determiner 151 determines that an abnormality is present. In the present embodiment, the term "average" means an arithmetic mean (a value obtained by dividing the sum of values of all samples by its sample size), unless otherwise specifically stated. Upon determining that an abnormality is present, the abnormality presence/absence determiner 151 notifies the normal-state process-time analyzer 152 and the abnormal-state process-time analyzer 153 about the period in which the abnormality occurred and information indicating that the abnormality is detected.

On the basis of the message flow information regarding a transaction in a period in which a process is performed in a normal manner, the normal-state process-time analyzer 152 analyzes whether or not the process times of the servers in the tiers which execute the corresponding transaction have a correlative relationship therebetween. Hereinafter, the message flow information regarding a transaction in a period in which a process is performed in a normal manner is referred to as a "normal-state message flow information". For example, the normal-state process-time analyzer 152 determines, as the normal-state message flow information, message flow information for a period other than a specified period from when the abnormality presence/absence determiner 151 determines that an abnormality is detected.

The normal-state process-time analyzer 152 has a normal-state process-time storage unit 152a and a normal-state correlation-coefficient storage unit 152b. The normal-state process-time storage unit 152a stores an average process time of processes in the normal state for each segment type in each tier. For example, part of the storage area in the RAM 103 or the HDD 104 is used as the normal-state process-time storage unit 152a. The normal-state correlation-coefficient storage unit 152b stores a correlation coefficient for processes in the normal state for each segment type in each tier. For example, part of the storage area in the RAM 103 or the HDD 104 is used as the normal-state correlation-coefficient storage unit 152b.

On the basis of the transaction information regarding a transaction in a period in which an abnormality occurs, the abnormal-state process-time analyzer 153 analyzes whether or not the process times of the servers in the tiers which execute processes for the corresponding transaction have a correlative relationship therebetween. Hereinafter, the message flow information regarding a transaction in a period in which an abnormality is occurring is referred to as an "abnormal-state message flow information". For example, the abnormal-state process-time analyzer 153 determines, as the abnormal-state message flow information, message flow information for a specified period from when the abnormality presence/absence determiner 151 determines that an abnormality is detected.

The abnormal-state process-time analyzer 153 has an abnormal-state process-time storage unit 153a and an abnormal-state correlation-coefficient storage unit 153b. The abnormal-state process-time storage unit 153a stores an average process time of processes in the abnormal state for each segment type in each tier. For example, part of the storage area in the RAM 103 or the HDD 104 is used as the abnormal-state process-time storage unit 153a. The abnormal-state correlation-coefficient storage unit 153b stores a correlation coefficient for processes in the abnormal state for each segment type in each tier. For example, part of the storage area in the RAM 103 or the HDD 104 is used as the abnormal-state correlation-coefficient storage unit 153b.

The correlation determiner 154 determines whether or not a significant correlation is present, in accordance with the correlation coefficient calculated based on the normal-state message flow information. The correlation determiner 154 also determines whether or not a significant correlation is present, in accordance with the correlation coefficient calculated based on the abnormal-state message flow information. On the basis of the presence/absence of a significant correlation between the normal state and the abnormal state, the correlation determiner 154 determines whether or not the influence of an abnormality propagates between the servers. For example, upon determining that no significant correlation is present in the normal state and a significant correlation is present in the abnormal state with respect to the process time per process of the servers in two tiers, the correlation determiner 154 determines that an abnormality of the server in the lower tier propagates to the server in the upper tier. The correlation determiner 154 displays a result of the influence-propagation determination on, for example, the monitor 11.

Figure 5:
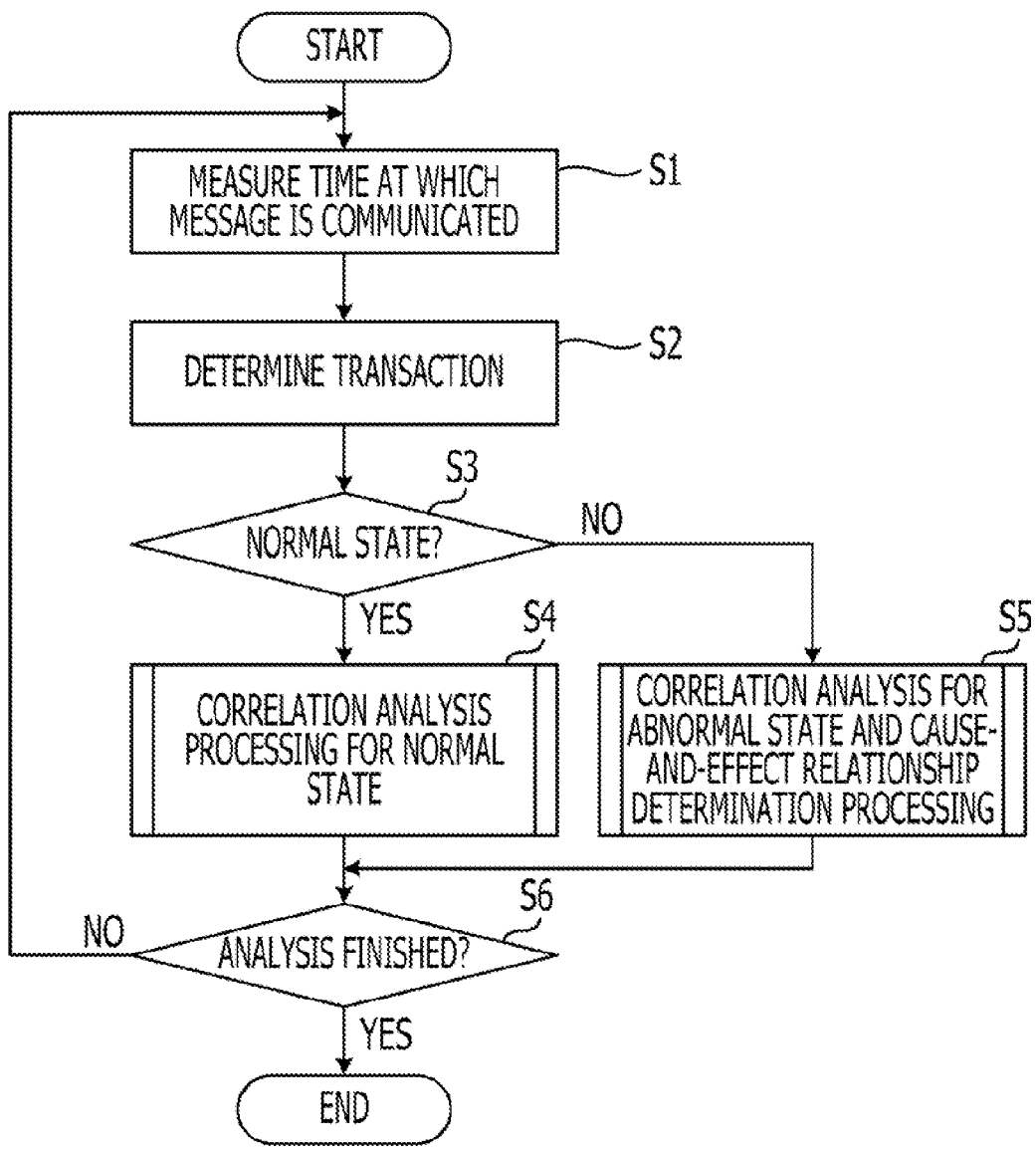
FIG. 5 is a flowchart illustrating an example of a procedure of influence-propagation analysis processing.

FIG. 5 is a flowchart illustrating an example of a procedure of the influence-propagation analysis processing. The processing illustrated in FIG. 5 will now be described along with operation numbers.

In operation S1, the message analyzer 110 obtains captured packets for a specified period of time (e.g., 30 minutes), reconstructs a message on the basis of the obtained packets, and measures the time at which the message is communicated. The message analyzer 110 regards, as the communication time of the message, the time at which the first packet used in the communication of the message is obtained. The message analyzer 110 causes the message with the communication time to be stored in the message storage unit 120.

When the obtaining of the messages for the specified period is completed, the process proceeds to operation S2 in which the message-flow detector 130 determines, in the messages stored in the message storage unit 120, a set of messages (a message flow) that constitute an individual transaction. The message-flow detector 130 then stores, in the message-flow-information storage unit 140, message flow information indicating a message flow corresponding to the transaction.

In operation S3, the abnormality presence/absence determiner 151 in the influence-propagation analyzer 150 determines whether the system is in a normal state or an abnormal state.

The normal state and the abnormal state (i.e., a state in which the process time increases) are distinguished from each other according to a response time at the terminal apparatus. The abnormal state is a state in which the response time is significantly greater than an average value in the normal state. In an actual system, it is often difficult to measure an accurate response time at all terminal users. In such a case, the response time of the server in the highest tier in the system may be used as the response time of the terminal apparatus.

In the second embodiment, when the response time of the server in the highest tier, the response time being stored in the message-flow-information storage unit 140, exceeds a specified time, the abnormality presence/absence determiner 151 determines that an abnormality is present. For example, when the response time of the server in the highest tier exceeds 0.1 second, the abnormality presence/absence determiner 151 determines that the system is in the abnormal state. The abnormality presence/absence determiner 151 uses the time from reception of a request message until transmission of a response message as the response time of the server in the highest tier.

When the system is in a normal state, the process proceeds to operation S4. When the system is in an abnormal state, the process proceeds to operation S5.

In operation S4, the normal-state process-time analyzer 152 performs inter-server correlation analysis processing for the normal state. Details of the processing are described below (with reference to FIG. 10). After operation S4, the process proceeds to operation S6.

In operation S5, the abnormal-state process-time analyzer 153 and the correlation determiner 154 perform inter-server correlation analysis for the abnormal state and cause-and-effect relationship determination processing. Details of the processing are described below (with reference to FIGS. 12 and 13). After operation S5, the process proceeds to operation S6.

In operation S6, the message analyzer 110 determines whether or not the analysis is to be finished. For example, when the user performs operation input for finishing the analysis, the message analyzer 110 determines that the analysis is to be finished. For example, when a period of analysis is pre-specified and the period of analysis ends, the message analyzer 110 determines that the analysis is to be finished. When it is determined that the analysis is to be finished, the processing illustrated in FIG. 5 ends. When it is determined that the analysis is to be continued, the process returns to operation 51.

Next, a description will be given of an example of a data structure. A specific example of a flow of messages transmitted/received in the task system will first be described and then an example of a data structure managed for the messages will be described.

Figure 6:
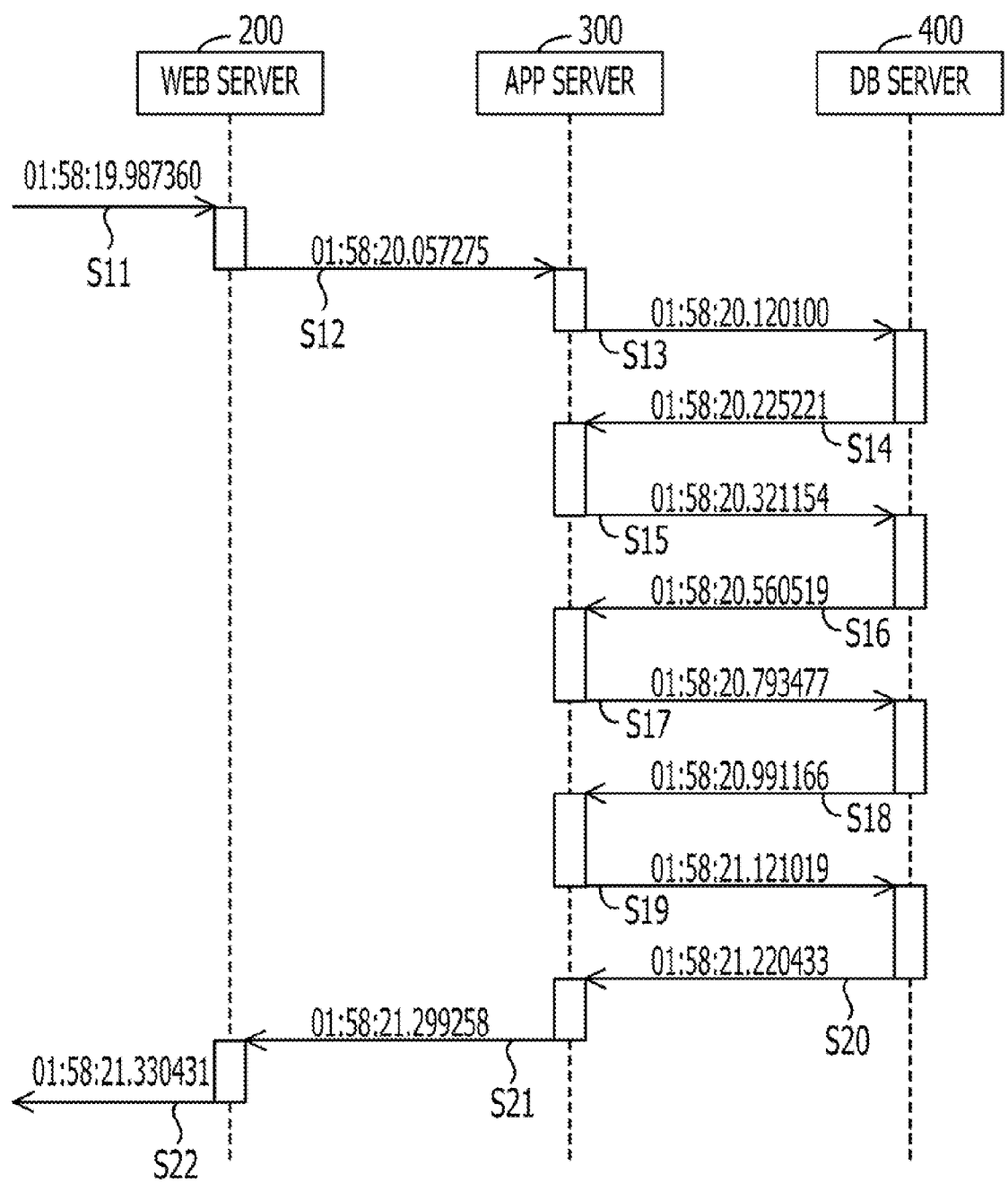
FIG. 6 is a sequence diagram illustrating a specific example of a flow of communication in the task system.

FIG. 6 is a sequence diagram illustrating a specific example of a flow of communication in the task system. The processing illustrated in FIG. 6 will now be described along with operation numbers. In FIG. 6, a time stamp (hour: minute: second. micro second) indicating the time at which a communication packet for a corresponding message is captured is indicated in each operation.

In operation S11, the web server 200 receives an HTTP request from the terminal apparatus 21 (at time "01:58:19.987360").

In operation S12, the app server 300 receives an IIOP request from the web server 200 (at time "01:58:20.057275").

In operation S13, the DB server 400 receives a DB request from the app server 300 (at time "01:58:20.120100").

In operation S14, the app server 300 receives a DB response from the DB server 400 (at time "01:58:20.225221").

In operations S15, S17, and S19, the DB server 400 receives DB requests from the app server 300, and correspondingly, in operations S16, S18, and S20, the app server 300 receives DB responses from the DB server 400.

In operation S21, the web server 200 receives an IIOP response from the app server 300 (at time "01:58:21.299258").

In operation S22, the web server 200 transmits an HTTP response to the terminal apparatus 21 (at time "01:58:21.330431").

In a manner described above, the messages are exchanged between the servers.

The HTTP requests received from the terminal apparatuses 22 and 23 are exchanged in a substantially similar manner.

The messages illustrated in FIG. 6 are communicated in the form of communication packets between the servers. The message analyzer 110 in the operation management server 100 captures the communication packets transmitted/received between the apparatuses and restores corresponding messages. For example, a method disclosed in Japanese Unexamined Patent Application Publication No. 2006-011683 may be used to restore the messages. The restored messages are stored in the message storage unit 120, for example, in accordance with a time sequence.

FIG. 7 illustrates a first part of an example of messages stored in the message storage unit. FIG. 8 illustrates a second part of the example of the messages stored in the message storage unit. Multiple restored messages are stored in the message storage unit 120. In FIGS. 7 and 8, the number of a row in the message storage unit 120 is indicated at the left of each message. The messages stored in the message storage unit 120 include the contents of the messages in the operations illustrated in FIG. 6. Messages other than the messages associated with the process requests and responses transmitted/received between the tiers are not illustrated as examples in the message storage unit 120.

The message illustrated in each row has a date field 120*a*, a time field 120*b*, a session-number field 120*c*, a transmission-source address field 120*d*, a transmission-destination address field 120*e*, a command-type field 120*f*, and a message field 120*g*.

The date field 120*a* indicates date on which the corresponding message is captured.

The time field 120*b* indicates time at which the message is captured.

The session-number field 120*c* indicates a session number for managing resources used for transmitting/receiving the message in the task system.

The transmission-source address field 120*d* indicates an IP (internet protocol) address and a port number of a computer from which the message was transmitted.

The transmission-destination address field 120*e* indicates an IP address and a port number of a computer to which the message was transmitted.

The command-type field 120*f* indicates a request/response attribute of a command and a type of protocol (e.g., HTTP, IIOP, and DB query).

The message field 120*g* indicates the contents of a message of a request or the like indicated by the command-type field 120*f*.

A description will be given below in conjunction with the row numbers in the message storage unit 120.

For example, the HTTP request in operation S11 illustrated in FIG. 6 corresponds to the first row.

In the date field 120a, for example, 2009 Sep. 7 is set in the row as the date on which a corresponding communication packet is captured.

In the time field 120b, for example, 01:58:19.987360 is set as the time at which the packet is captured.

In the session-number field 120c, for example, 132290-1 is indicated as a session number. In the session-number field 120c, unique information is indicated a set of a request and a response. This is because a single session is used to exchange a request and a response corresponding to the request. For example, a message in the 18th row is specified as an HTTP response corresponding to the HTTP request in the first row.

In the transmission-source address field 120d in the message in the first row, for example, 194.185.39.24:51272 is set as the IP address and the port number of the terminal apparatus 21 that transmitted the HTTP request.

In the transmission-destination address field 120e in the first row, for example, 194.23.6.226:10443 is set as the IP address and the port number of the web server 200 to which the HTTP was transmitted.

In the command-type field 120f in the message in the first row, for example, information "Request HTTP" is set as information indicating that this message is a message for an HTTP request. In the message field 120g in the message in the first row, for example, information "POST/cgi-bin/ . . . " is set as the contents of the HTTP request.

Thus, reference to the messages in the message storage unit 120 makes it possible to detect what type of message is transmitted to a particular server.

Now, a description will be given of correspondence relationships between, in the messages in the message storage unit 120, other IP addresses and the apparatuses.

"194.23.7.168" indicates the IP address of the app server 300. "194.23.8.198" indicates the IP address of the DB server 400. "194.185.39.25" indicates the IP address of the terminal apparatus 22. For example, the transmission and reception of the HTTP request and the HTTP response between the web server 200 and the terminal apparatus 22 correspond to the messages in the sixth and 20th rows. For example, the transmissions and receptions of the IIOP request and the IIOP response between the web server 200 and the app server 300 correspond to the messages in the second, seventh, 17th, and 19th messages in the message storage unit 120. The transmissions and receptions of the DB request and the DB response between the app server 300 and the DB server 400 correspond to the messages in the third to fifth messages and the eighth to 16th messages in the message storage unit 120.

Although the timestamp indicating the time at which the message analyzer 110 captures a communication packet is set as information in the date field 120a and the time field 120b, a setting method is not limited thereto. For example, when a communication packet includes information indicating date and time at which each server generates or transmits the packet, the date and time may be used as the information in the date field 120a and the time field 120b. In such a case, it is desired that the servers perform time synchronization with high accuracy.

On the basis of the time-sequential messages illustrated in FIGS. 7 and 8, the message-flow detector 130 detects a message flow indicating the series of processes. One example of the message flow detected is a set of messages that match the predefined transaction model. Such message-flow detection may be realized by, for example, a method disclosed in Japanese Unexamined Patent Application Publication No. 2006-011683. The type of detected message flow is identified according to, for example, the matching transaction model. The message-flow detector 130 then stores, in the message-flow-information storage unit 140, message flow information indicating the message flow classified according to the corresponding segment type.

Figure 9:
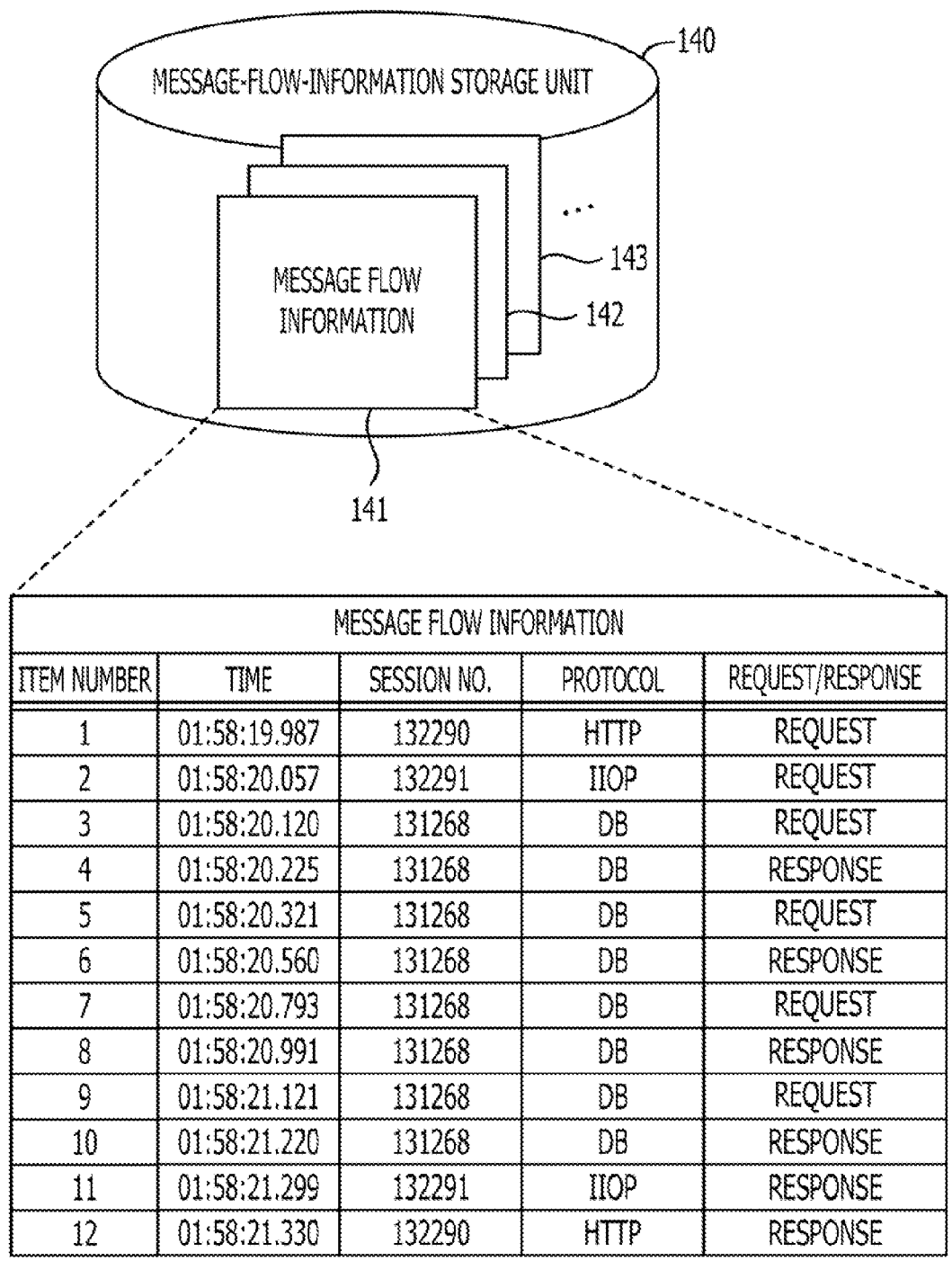
FIG. 9 illustrates an example of the data structure of a message-flow information storage unit.

FIG. 9 illustrates an example of the data structure of the message-flow information storage unit. Pieces of message flow information 141, 142, 143, . . . for respective transactions are stored in the message-flow-information storage unit 140. The message flow information 141, 142, 143, . . . illustrated in FIG. 9 are examples of the transaction information 2a, 2b, 2c, . . . in the first embodiment.

The message flow information 141 includes an item indicating a item number, an item indicating time, an item indicating a session number, an item indicating a protocol, and an item indicating request/response. Pieces of information in each item which are horizontally arranged are associated with each other to represent information regarding one message.

In the item indicating the item number, a number for identifying the record is set. In the item indicating the time, the time at which a communication packet corresponding to a message is captured is set. In the item indicating the session number, a session number for identifying a session used for transmitting the message is set. In the item indicating the protocol, information indicating which protocol is used for the message is set. In the item indicating request/response, information indicating which of a response and a response the message corresponds is set.

In the message flow information 141, for example, information indicating that the item number is "1", the time is "01:58:19.987", the session number is "132290", the protocol is "HTTP", and the Request/Response is "Request" is set.

This record corresponds to the message in the first row in the message storage unit 120. The time with an accuracy of milliseconds is set. In this point, the time may be obtained in smaller units of time (e.g., in microseconds). Information indicating, of the information included in the session-number field 120c illustrated in FIG. 8, a minimum information needed to specify a set of a request and a response is set as the session number. The expression "session number" used hereinafter refers to information set for an item indicating the session number in the message flow information 141.

In the message flow information, the communication time of each message is set. That is, the communication time of each message included in a message flow is measured based on a captured packet. When a message for requesting a process arrives in one tier and a message for issuing a request for a process to the lower tier is transmitted in connection with the process, an association therebetween is determined based on continuous messages in the message flow. That is, when a protocol "IIOP" request message is followed by a protocol "DB" request message, it is known that the "DB" request message is output in connection with the "IIOP" request message. It also is known that each request message in the lower tier in a time slot from when the request message in the upper tier is received until the response message is output is executed in connection with a process executed in response to the request message in the upper tier.

Thus, in the second embodiment, IP packets flowing over the network are captured and information regarding the message transmission/reception is obtained therefrom to generate message flow information indicating a series of processes. This method has some advantages. For example, since unwanted load is not applied to a system to be observed, behavior thereof is accurately observed. In addition, since the time stamp is given during capture at a server at one location, there is no need to be concerned about time error between servers.

The second embodiment is directed to a case in which messages are not given any information for associating the messages. Thus, for example, the message-flow detector 130 makes a determination as to whether or not the messages match the transaction model. The messages, however, may be given information for associating the messages, for example, when the identification information of a transaction executed in response to a request message input to the server (the web server 200) in the highest tier is given to each message communicated in the transaction. In such a case, the message-flow detector 130 extracts the messages given substantially the same identification information, to generate a message flow.

In the present embodiment, although the message flow information is created using the method disclosed in Japanese Unexamined Patent Application Publication No. 2006-011683, a scheme for creating the message flow information is not limited thereto. Some schemes are conceivable for measuring a series of message flows communicated across multiple tiers with respect to individual task processes and obtaining accurate time at which each of the messages is transmitted/received.

One example of another method is a method in which the web server 200, the app server 300, and the DB server 400 included in the three-tier web system use a message transmission/reception log recorded in a file or the like. With such a method, the web server 200, the app server 300, and the DB server 400 associate reception messages and transmission messages relevant to processes for the reception messages and records, as log information, the associated messages to a recording device, such as a HDD. The operation management server 100 obtains the recorded log information from the web server 200, the app server 300, and the DB server 400. In this scheme, the web server 200, the app server 300, and the DB server 400 associate received request messages and request messages output to the servers in the lower tiers as a result of the processes corresponding to those received request messages. Consequently, the operation management server 100 easily associates the higher-tier message(s) or and lower-tier message(s) that form one transaction, thus facilitating creation of a message flow. With this method, however, it is preferable that internal clocks of the web server 200, the app server 300, and the DB server 400 be pre-synchronized with each other.

On the basis of message flow information as illustrated in FIG. 9, the influence-propagation analyzer 150 analyzes whether or not an influence propagates between the servers in the different tiers.

The abnormality presence/absence determiner 151 in the influence-propagation analyzer 150 determines the presence/absence of an abnormality in processes. For example, the abnormality presence/absence determiner 151 has a threshold set for the average time taken for the server in the highest tier to make a response to the terminal apparatuses 21 to 23. The abnormality presence/absence determiner 151 calculates, in each piece of message flow information in the message-flow-information storage unit 140, a response time from when the server in the highest tier receives a request from the terminal apparatus until the server in the highest tier makes a response. In the example of the message flow information 141 illustrated in FIG. 9, subtracting the time of the item number 1 from the time of the item number 12 yields a response time of the transaction indicated by the message flow information 141. When the average response time of transactions executed in a specified period exceeds a response-time threshold, the abnormality presence/absence determiner 151 determines that an abnormality is present.

The abnormality determination may be made based on information other than the transaction response time. For example, a threshold for the average process time of the server in each tier may be preset. In such a case, when the process time of the server in any of the tiers exceeds the preset threshold, the abnormality presence/absence determiner 151 determines that an abnormality is present.

The abnormality presence/absence determiner 151 notifies another element in the influence-propagation analyzer 150 about the presence/absence of an abnormality. For example, the abnormality presence/absence determiner 151 notifies the normal-state process-time analyzer 152 and the abnormal-state process-time analyzer 153 about the period in which an abnormality is detected and a period in which no abnormality is detected.

In the present embodiment, whether or not an influence propagates is determined based on a correlation coefficient calculated from the message flow information obtained in the normal state in which the amount of process time is small and a correlation coefficient calculated from the message flow information obtained in the abnormal state (i.e., when the process time increases). The normal-state process-time analyzer 152 calculates the correlation coefficient for the normal state. The abnormal-state process-time analyzer 153 calculates the correlation coefficient for the abnormal state.

A procedure of calculating a value indicating a correlative relationship in a normal state will be described first.

Figure 10:
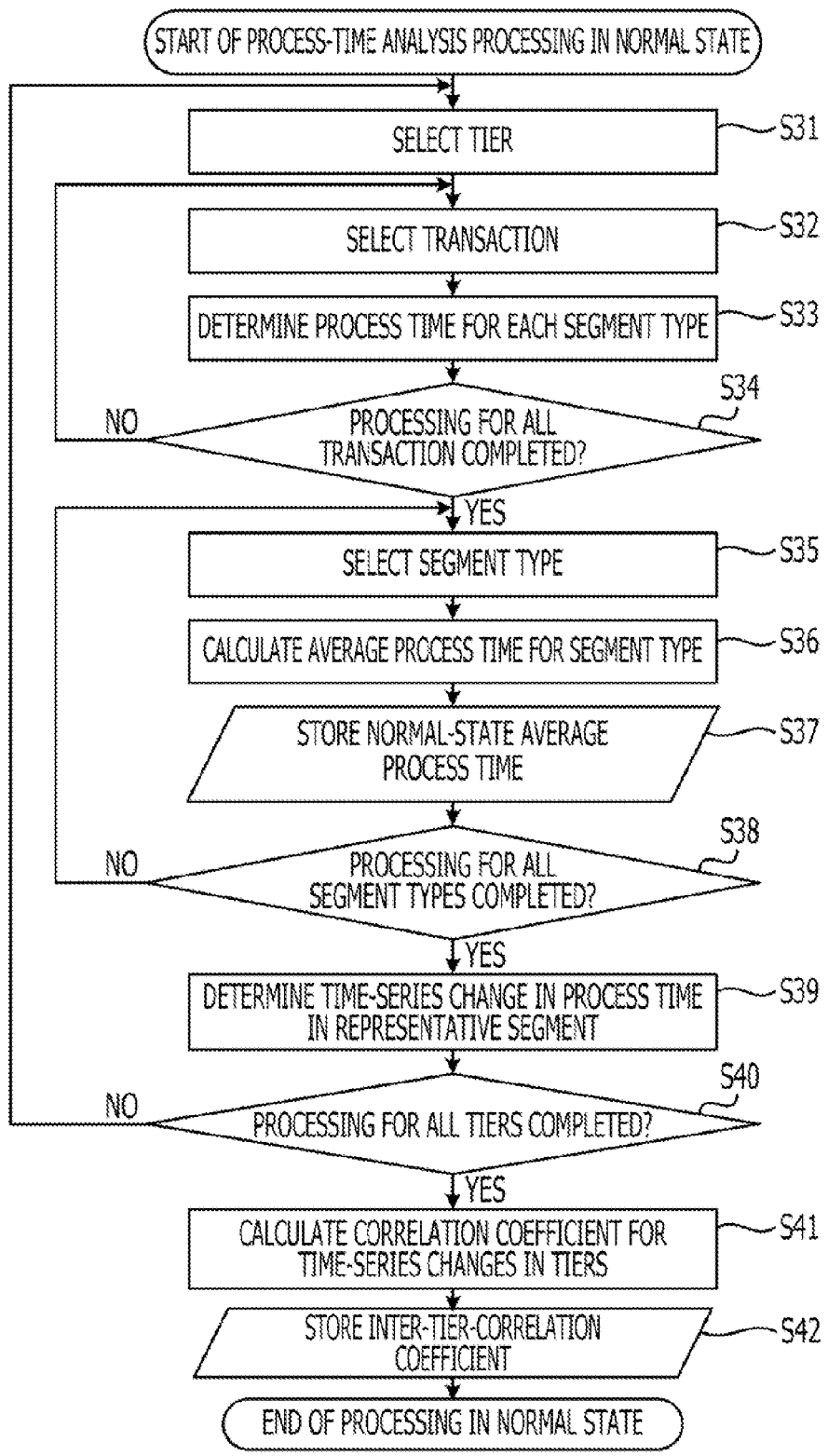
FIG. 10 is a flowchart illustrating an example of a procedure of process-time analysis processing in the normal state.

FIG. 10 is a flowchart illustrating an example of a procedure of the process-time analysis processing in the normal state. The processing illustrated in FIG. 10 will now be described along with operation numbers.

In operations S32 to S39, the normal-state process-time analyzer 152 executes processing for each tier. In the second embodiment, the tiers are constituted by three tiers: an HTTP tier, an IIOP tier, and a DB tier. Thus, first, in operation S31, the normal-state process-time analyzer 152 selects one unprocessed tier.

In operation S32, the normal-state process-time analyzer 152 selects a transaction. In operation S33, the normal-state process-time analyzer 152 determines a process time for the selected transaction. That is, the normal-state process-time analyzer 152 selects one unprocessed transaction indicated by the message flow stored in the message-flow-information storage unit 140.

In operation S33, with respect to the selected transaction, the normal-state process-time analyzer 152 calculates process times in individual segments on a time axis. In the second embodiment, with respect to each tier, the normal-state process-time analyzer 152 classifies each process time into one of four types of segment, on the basis of the communication time of each message, and determines the process time.

Figure 11:
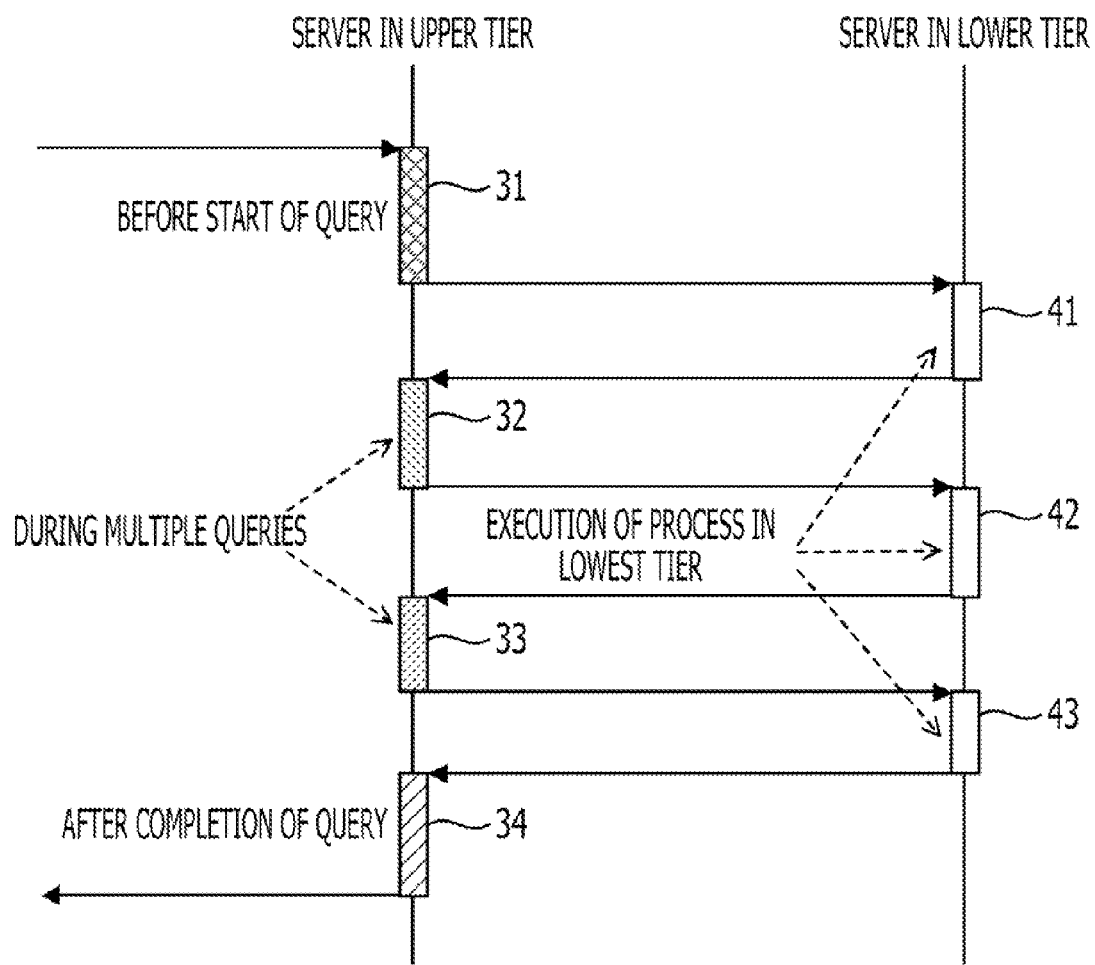
FIG. 11 illustrates an example of classified process segments of the servers with respect to one transaction.

FIG. 11 illustrates an example of classified process segments of the servers with respect to one transaction. FIG. 11 illustrates processes of the servers in the lowest two tiers with respect to one transaction. The server in the upper one of the two tiers is, for example, the app server 300. The server in the lower tier is, for example, the DB server 400.

The server in the upper tier executes a process in response to a received request message and issues, during the execution of the process, three queries to the server in the lower tier. The period when the server in the upper tier waits for a response after making each query to the server in the lower tier is a waiting time during which no process is performed. Thus, the server in the upper tier executes processes 31 to 34 at four separate times.

On the other hand, each time the server in the lower tier receives a query (a request message) from the server in the upper tier, the server in the lower tier executes a corresponding one of processes 41 to 43.

In the second embodiment, the process time of the server in the upper tier is classified into the following four types of segment.

First Type of Segment

The first type of segment is a segment before the start of a query (which is hereinafter referred to as a "pre-query-start" segment). That is, the first type of segment corresponds to a period of time from when the server in the upper tier starts a process until the server in the upper tier transmits a first-query request message to the lower tier. In the example of FIG. 11, the period in which the process 31 is executed corresponds to the first type of segment.

Second Type of Segment

The second type of segment is a segment during multiple queries (which is hereinafter referred to as a "multiple queries" segment). That is, the second type of segment is a period of time from when the server in the upper tier receives a response message corresponding to a query request message transmitted to the server in the lower tier until the server in the upper tier issues a next query to the server in the lower tier. In the example of FIG. 11, the periods of time in which the processes 32 and 33 are executed correspond to the second type of segment. When multiple periods corresponding to the second type of segment exist in one transaction, for example, an average of the process times per process may be used as the process time of the processes for the second type of segment.

Third Type of Segment

The third type of segment is a segment after completion of a query (which is hereinafter referred to as a "post-query-completion" segment). That is, the third type of segment is a period of time from when the server in the upper tier receives a response message corresponding to a last query request message transmitted to the server in the lower tier until the process in the upper tier is finished. In the example of FIG. 11, the period in which the process 34 is executed corresponds to the third type of segment.

When the number of queries to the lower tier is only one, the "multiple queries" segment (the second type of segment) does not exist. Since the server in the lowest tier (the server in the lower tier in FIG. 11) does not have a query issued to a tier lower than that tier, the server in the lowest tier does not have the three segments. In such a case, instead, process times of the processes 41 to 43 in the server in the lowest tier are calculated. When the server in the lowest tier executes processes for multiple requests from the upper tier, this means that the server in the lowest tier has multiple process times. In such a case, an average value per process is used as a process time for the lowest tier.

The process time of the server in the lowest tier is classified into a segment type (as described below) other than the segment types of the server in the upper tier.

Fourth Type of Segment

The fourth type of segment is an "overall process time" segment. In a period from when the server in the lowest tier receive receives a request message from the server in the higher tier until the server in the lowest tier transmits a response message to the server in the upper tier, the time for waiting for a process of the other servers is not reduced. Thus, the server in the lowest tier does not have the first to third types of segment. Accordingly, the process time from reception of a request message until transmission of a response message in response thereto is set as the fourth type of segment. In the example of FIG. 11, the period of time in which each of the processes 41 to 43 is executed corresponds to the fourth type of segment.

Processing in operation S34 and subsequent operations will now be described with reference back to FIG. 10.

In operation S34, the normal-state process-time analyzer 152 determines whether or not the processing in operation S33 has been completed with respect to all transactions. When an unprocessed transaction exists, the normal-state process-time analyzer 152 returns the process to operation S32. When the processing in operation S33 has been completed with respect to all transactions, the normal-state process-time analyzer 152 advances the process to operation S35.

The normal-state process-time analyzer 152 executes processing in operations S36 and S37 for each of the segment types (the first to fourth types of segment). That is, in operation S35, the normal-state process-time analyzer 152 selects one segment type from unprocessed segment types.

Next, in operation S36, the normal-state process-time analyzer 152 determines an average process time for the segment type selected in operation S35. That is, the normal-state process-time analyzer 152 calculates, for each specified time slot, an average value (an average process time) of the process times of the process for the selected segment type in the selected tier.

In this case, the normal-state process-time analyzer 152 calculates, for example, per-minute average process times for determining a time-series change and an average process time of an entire analysis period (e.g., for 14 minutes) for calculating a rate of increase in the process time in the abnormal state relative to the process time in the normal state.

In operation S37, the normal-state process-time analyzer 152 stores the normal-state average process time in the normal-state process-time storage unit 152a.

In operation S38, the normal-state process-time analyzer 152 determines whether or not the processing in operations S36 and S37 has been completed with respect to all segment types. When an unprocessed segment type exists, the normal-state process-time analyzer 152 returns the process to operation S35. When the processing in operations S36 and S37 has been completed with respect to all segment types, the normal-state process-time analyzer 152 advances the process to operation S39.

In operation S39, the normal-state process-time analyzer 152 determines a time-series change in the process time in a representative segment. In this case, in the second embodiment, the normal-state process-time analyzer 152 determines the representative segment in a manner described below.

When a "multiple queries" segment (i.e., the second type of segment) exists, the normal-state process-time analyzer 152 selects the "multiple queries" segment with the highest priority and sets it as the representative segment. When no "multiple queries" segment exists, the normal-state process-time analyzer 152 sets the process time in the "post-query-completion" segment as the representative segment. In addition, when neither the "multiple queries" segment nor the "post-query-completion" segment exists (e.g., when the tier that is being processed is the lowest tier), the normal-state process-time analyzer 152 sets, as the representative segment, the overall segment (the fourth type of segment) of the process times of individually executed processes.

For calculation of time-series changes, the normal-state process-time analyzer 152 divides a period of analysis at intervals of one minute and determines an average value of the process times of the processes executed in the period of one minute. The normal-state process-time analyzer 152 then determines how the average value of the process time per minute has changed for a specified period (e.g., 30 minutes).

The granularity and the length of the process time and the time-series changes will be discussed below.

Granularity of Time-Series Change

In the second embodiment, the average values are aggregated every minute and time-series changes in the per-minute average process times are used. Since the time at which the message is transmitted/received is measured with an accuracy of one millisecond or less, accuracy at that level is used for the aggregation. However, such a short time does not need to be used as a unit time for the aggregation, and accuracy on the order of one minute is sufficient therefor. An excessive reduction in the unit time for the aggregation can cause adverse effects. For example, the amount of calculation for the correlation determination may increase and the correlation coefficient may be affected by temporary fluctuations in the process time. With an excessively large unit time, however, a correct determination cannot be made when a connection for a sufficient amount of time cannot be established to cause a bottleneck.

Length of Time-Series Change

When the time sequence in which the analysis is executed is short, even a large correlation coefficient cannot be said to be statistically significant. Accordingly, a time-series change for a certain degree of time in which at least statistically significant analysis result is obtained is determined. On the other hand, when the time sequence is too long, a time-series change in an abnormal state (i.e., a period in which the process time increases) may involve information in a normal state, thus increasing the possibility that a correct determination cannot be made. When such situations are considered, it is appropriate to determine the length of the time sequence (i.e., the period of analysis) change so that the sample size is about 10 to 30. In an example described below and illustrated in FIG. 16, the aggregation is performed every one minute and a time-series change for 14 minutes is used. In this case, the sample size is 14.

In operation S40, the normal-state process-time analyzer 152 determines whether or not the processing in operations S32 to S39 has been completed with respect to all tiers. When an unprocessed tier exists, the normal-state process-time analyzer 152 returns the process to operation S31. When the processing in operations S32 to S39 has been completed with respect to all tiers, the normal-state process-time analyzer 152 advances the process to operation S41

In operation S41, the normal-state process-time analyzer 152 calculates, for each combination of tiers, a correlation coefficient for a correlation between the time-series changes in the tiers.

The correlation coefficient has a numeric value representing a correlation (the degree of similarity) between two variables. When the time-series change in the process time in one tier is represented by $x_1, x_2, x_3, \ldots, x_n$ and the time-series change in the process time in another tier is represented by $y_2, y_3, \ldots, y_n$, the coefficient $r_{xy}$ for the correlation therebetween is calculated as:

$$r_{xy} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}} \quad (1)$$

where $\bar{x}$ and $\bar{y}$ are arithmetic means of data $x=\{x_i\}$ and $y=\{y_i\}$, respectively.

In operation S42, the normal-state process-time analyzer 152 stores the inter-tier-correlation coefficient in the normal-state correlation-coefficient storage unit 152b. Thereafter, the processing for the normal state ends.

The inter-tier-correlation coefficient for the normal state is calculated as described above.

Next, a description will be given of correlation-coefficient analysis processing in an abnormal state (i.e., when the process time increases).

Figure 12:
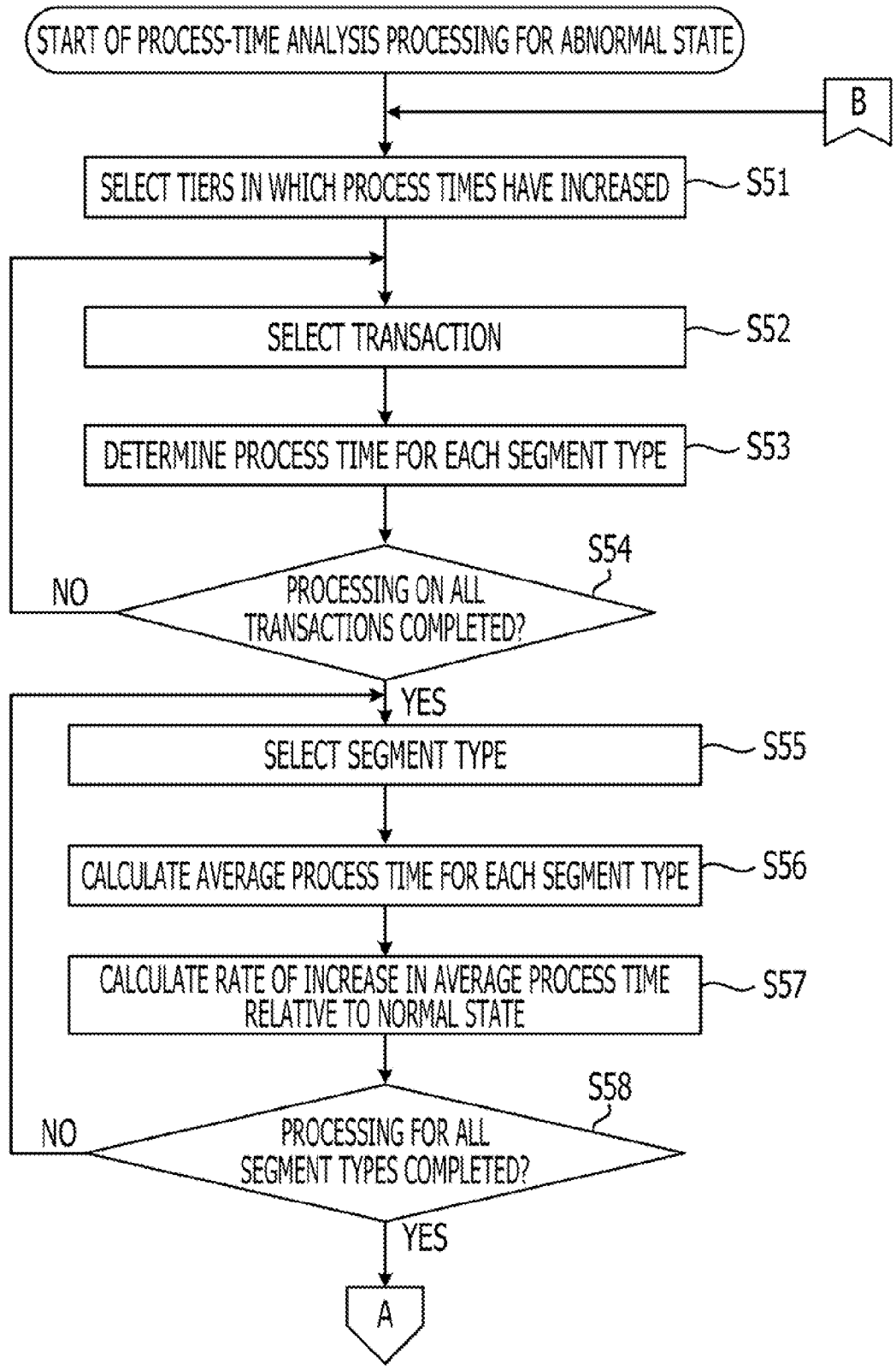
FIG. 12 is a first half of a flowchart illustrating one example of a procedure of process-time analysis processing in an abnormal state.

FIG. 12 is a first half of a flowchart illustrating one example of a procedure of process-time analysis processing in an abnormal state. The processing illustrated in FIG. 12 will now be described along with operation numbers.

The abnormal-state process-time analyzer 153 executes processing in operations S52 to S63 (in FIG. 13) for each tier in which the process time increased. Thus, in operation S51, the abnormal-state process-time analyzer 153 selects one unprocessed tier from the tiers in which the process time increased. The abnormal-state process-time analyzer 153 also executes the processing in operations S52 to S62 not only on the tier in which the process time increased but also on all tiers.

The abnormal-state process-time analyzer 153 executes, for each transaction, the processing in operation S53 (described below) on the tier selected in operation S51. Thus, in operation S52, the normal-state process-time analyzer 153 selects one unprocessed transaction indicated by the message flows stored in the message-flow-information storage unit 140.

In operation S53, with respect to the transaction selected in operation S52, the normal-state process-time analyzer 153 calculates process times in the individual segments. Details of the processing are substantially similar to those of operation S33 (in FIG. 10) in the process-time analysis processing in the normal state.

In operation S54, the abnormal-state process-time analyzer 153 determines whether or not the processing in operation S53 has been completed with respect to all transactions. When an unprocessed transaction exists, the abnormal-state process-time analyzer 153 returns the process to operation S52. When the processing in operation S53 has been completed with respect to all transactions, the normal-state process-time analyzer 153 advances the process to operation S55.

The abnormal-state process-time analyzer 153 executes processing in operations S56 and S57 (described below) for each of the segment types (the first to fourth types of segment). Thus, in operation S55, the abnormal-state process-time analyzer 153 selects one unprocessed segment type.

In operation S56, the abnormal-state process-time analyzer 153 determines an average process time in the segment type selected in operation S55. That is, the abnormal-state process-time analyzer 153 calculates, for each specified time slot, an average value (an average process time) of the process times of the processes for the selected segment type in the selected tier. Examples of the predetermine time slot for calculating the average process time include the time slot of the entire period of analysis and one-minute time slots resulting from division of the period of analysis. A result of the calculation is stored in the abnormal-state correlation-coefficient storage unit 153b.

In operation S57, the abnormal-state process-time analyzer 153 calculates a rate of increase in the average process time relative to that in the normal state. More specifically, the abnormal-state process-time analyzer 153 obtains, from the normal-state process-time analyzer 152, the normal-state average process time determined in operation S36, and the abnormal-state process-time analyzer 153 determines a rate of increase in the abnormal-state average process time determined in operation S56 relative to the obtained normal-state average process time.

The rate of increase in the average process time is calculated with respect to each of the four segments. That is, the abnormal-state process-time analyzer 153 compares the average process time in the abnormal state with the average process time in the normal state with respect to each of the first to fourth segments. More specifically, the rate of increase in the average process time for each of the four segments is calculated by:

"Rate of Increase in Average Process Time"="Average Process Time in Abnormal State"/"Average Process Time in Normal State".

The abnormal-state process-time analyzer 153 stores, in the abnormal-state process-time storage unit 153a, the average process time determined in operation S56 and the rate of increase calculated in operation S57.

In operation S58, the abnormal-state process-time analyzer 153 determines whether or not the processing in operations S56 and S57 has been completed with respect to all segment types. When an unprocessed segment type exists, the abnormal-state process-time analyzer 153 returns the process to operation S55. When the processing has been completed with respect to all segment types, the abnormal-state process-time analyzer 153 advances the process to operation S61 (in FIG. 13).

Figure 13:
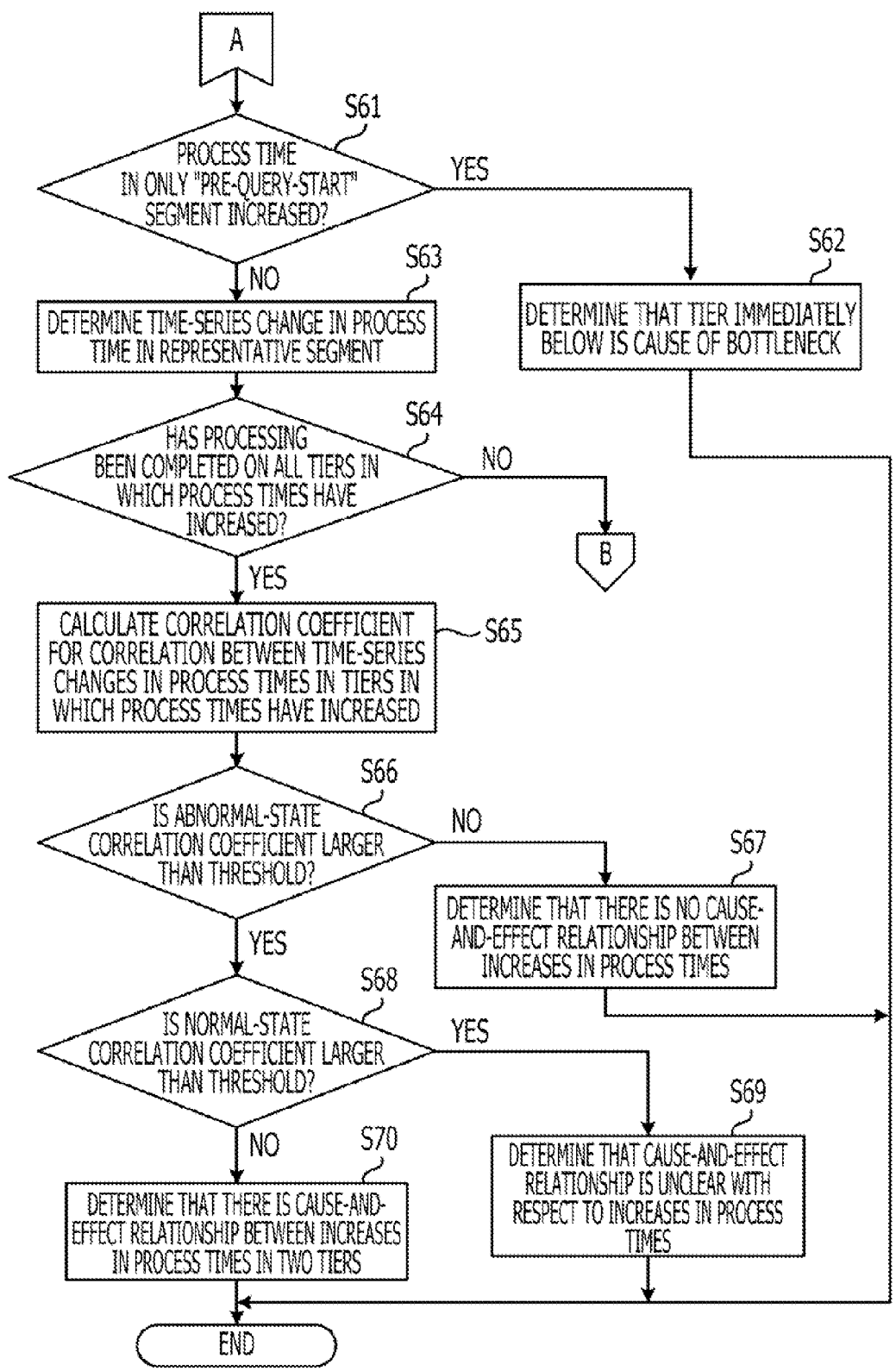
FIG. 13 is a last half of the flowchart illustrating the example of the procedure of the process-time analysis processing in the abnormal state.

FIG. 13 is a last half of the flowchart illustrating the example of the procedure of the process-time analysis processing in the abnormal state. The processing illustrated in FIG. 13 will now be described along with operation numbers.

In operation S61, with respect to the tier having processes classified into the first to third types of segment, the correlation determiner 154 determines whether or not a condition that the process time in only the "pre-query-start" segment (i.e., the first type of segment) increases and the process times in other segments (the second and third types of segment) do not increase is satisfied. That is, when the result of the rate-of-increase calculation (in operation S57 in FIG. 12) for each segment indicates that the rate of increase has a larger value than a certain threshold (e.g., 2.0), the correlation determiner 154 determines that the process time in the segment has increased. Thus, the correlation determiner 154 determines whether or not the condition that the rate of increase in the "pre-query-start" segment (the first type of segment) is higher than the certain threshold and both of the rate of increase in the "multiple queries" segment (the second type of segment) and the rate of increase in the "post-query-completion" segment (the third type of segment) are lower than or equal to the certain threshold is satisfied. When the condition is satisfied, the correlation determiner 154 determines that the process time in only the "pre-query-start" segment has increased.

When the process time has increased in only the "pre-query-start" segment, the process proceeds to operation S62. Otherwise, the process proceeds to operation S63.

With respect to the tier (the lowest tier) for which the "pre-query-start" segment does not exist, the determination in operation S61 is not executed and the process proceeds to operation S63.

In operation S62, the correlation determiner 154 determines that an abnormality that can cause a bottleneck is occurring in the server in the tier immediately below the tier that is currently processed. A result of the determination is displayed on, for example, the monitor 11. Thereafter, the processing ends.

Figure 14:
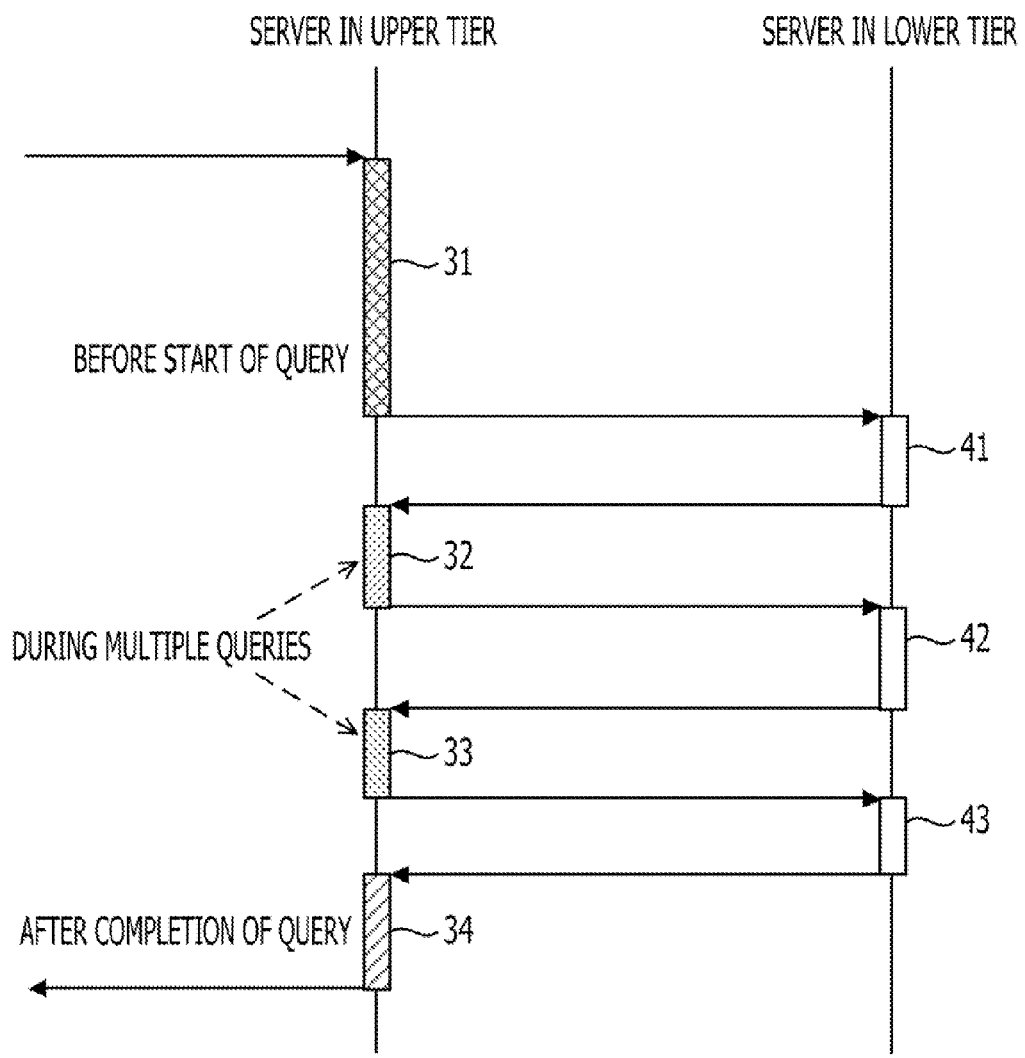
FIG. 14 illustrates a state in which the process time in only a "pre-query-start" segment has increased.

FIG. 14 illustrates a state in which the process time in only the "pre-query-start" segment has increased. In the example of FIG. 14, only the process time of the process 31 in the transaction illustrated in FIG. 11 has increased. When the process time has increased in only the "pre-query-start" segment and the process times in other two segments have not increased, as illustrated in FIG. 14, it is estimated that the increase in the process time in this tier is not due to an increase in the load of the server. The reason is that, when the process time in only the "pre-query-start" segment has increased, the server in the upper tier is merely waiting for a connection to be established to initiate a query to the server in the lower tier.

One example of a communication scheme is that multiple connections are pre-established between the servers and the server uses an available one of the connections to transmit a request message. In such a scheme, when all of the prepared connections are in use, the server at the transmitting end waits for any of the connections to become available. The time for such available-connection waiting is generated more often by a delay in the process of the server at the receiving end (the lower tier) with respect to a request message than by a cause due to the server in the transmitting end (the upper tier). When only the rate of increase in the "pre-query-start" segment out of the rates of increase in the three segments of the first to third types of segment exceeds the certain threshold (e.g., 2.0), the abnormal-state process-time analyzer 153 determines that the server in the tier immediately below has a problem, such as a bottleneck.

Processing in operation S63 and subsequent operations will now be described with reference back to FIG. 13.

In operation S63, the abnormal-state process-time analyzer 153 determines a time-series change in the process time in the "multiple queries" segment (i.e., the second type of segment). Details of the processing are substantially similar to those of operation S39 (in FIG. 10) in the normal-state correlation analysis processing.

In operation S64, the abnormal-state process-time analyzer 153 determines whether or not the processing in operations S52 to S62 has been completed with respect to all tiers in which the process times have increased. When an unprocessed tier exists in the tiers in which the process times have increased, the abnormal-state process-time analyzer 153 returns the process to operation S51 (in FIG. 12). When the processing has been completed with respect to all tiers in which the process times have increased, the abnormal-state process-time analyzer 153 advances the process to operation S65.

In operation S65, the abnormal-state process-time analyzer 153 calculates a correlation coefficient for a correlation between the time-series changes in the process times in the representative segments in two tiers in which the process times have increased. For example, when the rate of increase in the process time in the representative segment in one tier is higher than the certain threshold (e.g., 2.0), the abnormal-state process-time analyzer 153 determines that the process time of the server in the tier has increased. The abnormal-state process-time analyzer 153 then creates a set of two tiers in which the process times have increased and determines a correlation coefficient for a correlation between the time-series changes in, in the representative segments, the process times of the servers in the tiers belonging to the created set.

The abnormal-state process-time analyzer 153 stores the calculated correlation coefficient in the abnormal-state correlation-coefficient storage unit 153b.

In operation S66, the correlation determiner 154 determines whether or not the abnormal-state correlation coefficient calculated in operation S65 is larger than a specified threshold (e.g., 0.66). When the abnormal-state correlation coefficient is larger than the threshold, the process proceeds to operation S68. When the abnormal-state correlation coefficient is smaller than or equal to the threshold, the process proceeds to operation S67.

In operation S67, the correlation determiner 154 determines that there is no cause-and-effect relationship between the increases in the process times in the two tiers. A result of the determination is displayed on, for example, the monitor 11. Thereafter, the processing ends.

In operation S68, with respect to the set of two tiers for which the abnormal-state correlation coefficient was determined in operation S65, the correlation determiner 154 determines whether or not the normal-state correlation coefficient calculated in operation S41 (in FIG. 10) is larger than the specified threshold (e.g., 0.66). When the normal-state correlation coefficient is larger than the threshold, the process proceeds to operation S69. When the normal-state correlation coefficient is smaller than or equal to the threshold, the process proceeds to operation S70.

In operation S69, the correlation determiner 154 determines that a cause-and-effect relationship is unclear with respect to the increases in the process times in the two tiers. That is, when both of the correlation coefficient for the normal state and the correlation coefficient for the abnormal state are larger than the threshold, the increases in the process times may be due to an excessive increase in the number of processes requested from the terminal apparatus to the three-tier web system, rather than due to a problem of the servers. In such a case, for example, it is effective to take measures, such as enhancing the functions of the servers in the tiers in which the process times have increased. In addition, when an abnormality in the server in the lower tier is causing an increase in the process time of the server in the upper tier, taking countermeasures on the server in the lower tier may be sufficient to address the problem. Accordingly, in the second embodiment, when both of the correlation coefficient for the normal state and the correlation coefficient for the abnormal state are larger than the threshold, the correlation determiner 154 determines that a cause-and-effect is unclear with respect to the increases in the process times in the two tiers. A result of the determination is displayed on, for example, the monitor 11. Thereafter, the processing ends.

In operation S70, the correlation determiner 154 determines that there is a cause-and-effect relationship between the increases in the process times in the two tiers. A result of the determination is displayed on, for example, the monitor 11. Thereafter, the processing ends.

As described above, the presence/absence of a cause-and-effect relationship is determined with respect to increases in the process times of the servers in the tiers. When it is determined that there is a cause-and-effect relationship, the administrator of the system preferentially checks the cause of the increase in the process time of, of the servers in the tiers in which the process times have increased, the server in the lower tier. The administrator then eliminates the cause of the increase in the process time of the server in the lower tier. Consequently, the process time of the server in the lower tier returns to its normal value and the process time of the server in the upper one of the tiers having the cause-and-effect relationship should also return to its normal value.

Next, an example of analysis based on the processing described above in the second embodiment will be described in detail.

First, in operation S33 in FIG. 10, as processing in the normal state, process times for each segment type is calculated for each transaction. For example, when the calculation of the process times for each segment is applied to calculation for the process times of the tiers for the transaction illustrated in FIG. 6, the normal-state process-time analyzer 152 performs calculations as described below, on the basis of the message flow information illustrated in FIG. 9.

The process times of the web server 200 which are illustrated in FIGS. 6 and 9 are constituted by the "pre-query-start" segment (the first type of segment) and the "post-query-completion" segment (the third type of segment). Since the process times of the web server 200 do not include the second type of segment, the process time belonging to the third type of segment is used as the average process time of the web server 200 and is calculated as follows.

Calculation of Process Time of First Type of Segment
(Before Start of Query): (01:58:20.057–01:58:19.987)/1=0.070 (s)

Calculation of Process Time of Third Type of Segment (After Completion of Query): (01:58:21.330–01:58:21.299)/1=0.031 (s)

The process times of the app server 300 are calculated as equations below:

Calculation of Process Time of First Type of Segment
(Before Start of Query): 01:58:20.120–01:58:20.057=0.063 (s)

Calculation of Process Time of Second Type of Segment (During Multiple Queries)

In the example of FIG. 6, three processes corresponding to the second type of segment are executed and the average of the process times of the three processes is calculated. ((01:58:20.321–01:58:20.225)+(01:58:20.793–01:58:20.560)+(01:58:21.121–01:58:20.991))/3=0.153 (s)

Calculation of Process Time of Third Type of Segment (After Completion of Query:
01:58:21.299–01:58:21.220=0.079 (s)

Since the DB server 400 belongs to the lowest tier and does not issue a query to another server, only the overall process time (the fourth type of segment) exists. In the example of FIG. 6, four processes corresponding to the fourth type of segment are executed and the average of the process times of the four processes is calculated.

Calculation of Process Time of Fourth Type of Segment (Overall Process Time:

((01:58:20.225–01:58:20.120)+(01:58:20.560–01:58:20.321)+(01:58:20.991–01:58:20.793)+(01:58:21.220–01:58:21.121))/4=0.160 (s)

Those are values obtained as a result of calculation with respect to only one transaction executed in response to one process request issued from the terminal apparatus. In an actual system, however, transactions for a large number of process requests are simultaneously processed in the same time slot. Thus, in operation S36 in FIG. 10, the normal-state process-time analyzer 152 calculates, for each segment, an average value of the process times in each tier which were obtained for each transaction. The calculated average process time is stored in the normal-state process-time storage unit 152a of the normal-state process-time analyzer 152.

FIG. 15 illustrates one example of the data structure of the normal-state process-time storage unit. For example, a process-time management table 152c is stored in the normal-state process-time storage unit 152a. The process-time management table 152c has a "tier" column, a "segment" column, and an "average process time" column.

In the "tier" column, identifiers of the tiers are set. In the example of FIG. 15, numbers in ascending order are given in sequence with the higher tier first. The tier to which web server 200 in the highest tier belongs is tier 1. The tier to which the app server 300 belongs is tier 2. The tier to which the DB server 400 belongs is tier 3.

In the "segment" column, the segment types for the corresponding tiers are set. In the case of a transaction as illustrated in FIG. 6, the highest tier "tier 1" has the "pre-query-start" segment (the first type of segment) and the "post-query-completion" segment (the third type of segment). The tier "tier 2" has the "pre-query-start" segments (the first type of segment), the "multiple queries" segment (the second type of segment), and the "post-query-completion" segment (the third type of segment). The lowest tier "tier 3" has the "overall process time" segments (the fourth type of segment).

In the "average process time" column, the average value of the process times in the corresponding segment in the corresponding tier is set in units of milliseconds.

Data as indicated by the process-time management table 152c illustrated in FIG. 15 is obtained, for example, 14 times at intervals of one minute. Each time the data is obtained, a new process-time management table is additionally stored in the normal-state process-time storage unit 152a.

In operation S39 in FIG. 10, on the basis of the average process times stored in the normal-state process-time storage unit 152a, the normal-state process-time analyzer 152 determines, for each segment type in each tier, a time-series change in the process time in the normal state.

Figure 16:
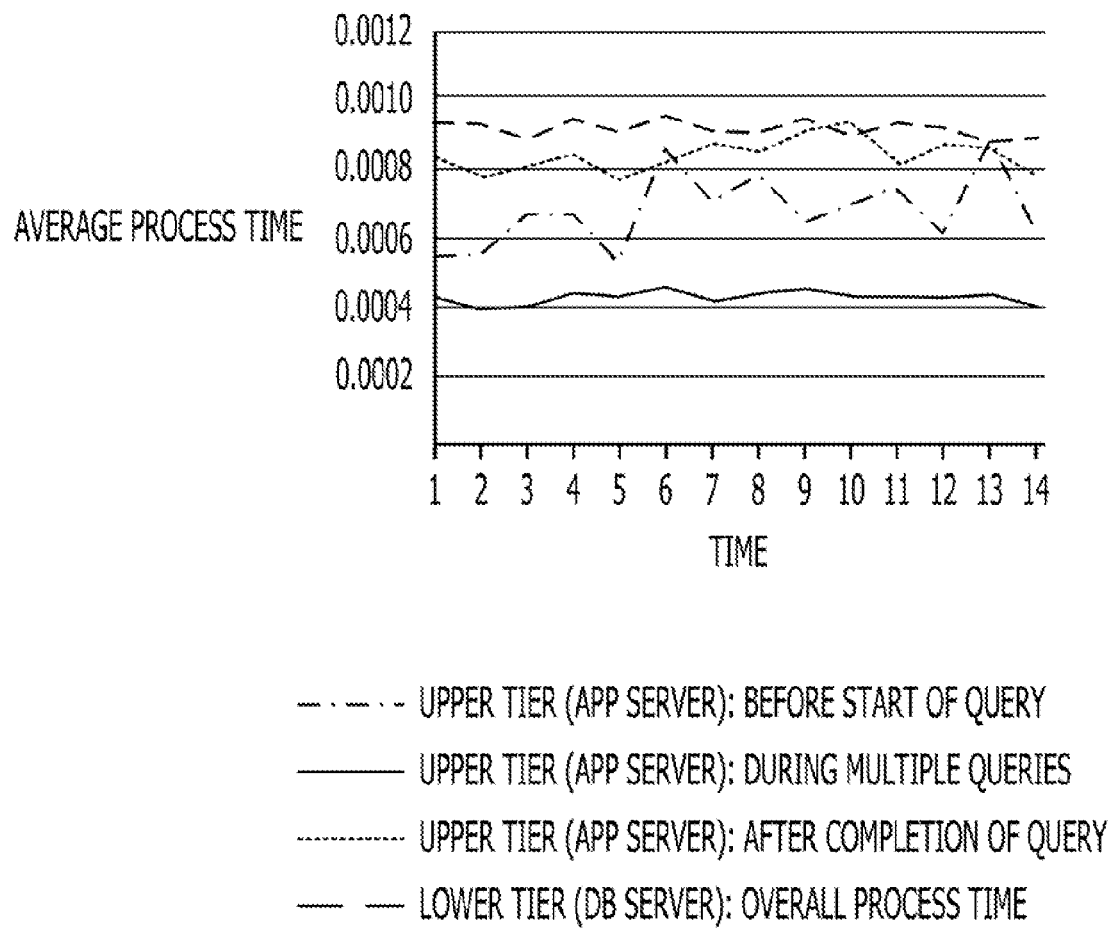
FIG. 16 illustrates time-series changes in the process time in a normal state.

FIG. 16 illustrates time-series changes in the process times in the normal state. In FIG. 16, the time-series changes in the process times in the normal state are illustrated in a graph with the horizontal axis indicating time and the vertical axis indicting an average process time.

The time-series changes illustrated in FIG. 16 are of the app server 300 and the DB server 400. In the example of FIG. 16, the "multiple queries" segments (the second type of segment) exist. Thus, in the processing in operation S39, the time-series change is analyzed with respect to only the "multiple queries" segments. In the example of FIG. 16, however, the time-series changes in the "pre-query-start" segment (the first type of segment) and the "post-query-completion" segment (the third type of segment) are also illustrated for convenience of reference.

Upon determination of the time-series changes, the correlation coefficient for the correlation between the upper tier and the lower tier is calculated in operation S41 in FIG. 10. The determined correlation coefficient is stored in the normal-state correlation-coefficient storage unit 152b.

FIG. 17 illustrates an example of the data structure of the normal-state correlation-coefficient storage unit. For example, a correlation-coefficient management table 152d is stored in the normal-state correlation-coefficient storage unit 152b. The correlation-coefficient management table 152d has a "higher tier" column, a "lower tier" column, and a "correlation coefficient" column.

In the "upper tier" column, the identifier of the upper tier of two tiers that are to be compared with each other for their correlative relationship and the segment type of the representing segment are set. In the example of FIG. 17, the identifier of the tier is set at the left side of the colon (:) and the segment type of the representative segment is set at the right side.

In the "lower tier" column, the identifier of the lower tier of two tiers that are to be compared with each other for their correlative relationship and the segment type of the representing segment are set. In the example of FIG. 17, the identifier of the tier is set at the left side of the colon (:) and the segment type of the representative segment is set at the right side.

In the "correlation coefficient" column, the correlation coefficient indicating the correlative relationship between the representative segment in the upper tier and the representative segment in the lower tier is set.

The inter-tier correlation coefficient for the normal state is calculated and stored, as described above. Subsequently, when the process time increases to reach a specified value or more, correlation analysis processing in the abnormal state is executed.

In the abnormal-state correlation analysis processing, in operation S53 in FIG. 12, process times for each segment type are calculated with respect to each transaction, as in the normal state. Thereafter, in operations S56 and S57 in FIG. 12, the average process time for each segment type is calculated and a rate of increase in the average process time relative to the average process time in the normal state is calculated. Results of the calculations of the average process time and the rate of increase are stored in the abnormal-state process-time storage unit 153a.

FIG. 18 illustrates one example of the data structure of the abnormal-state process-time storage unit. For example, a process-time management table 153c is stored in the abnormal-state process-time storage unit 153a. The process-time management table 153c has a "tier" column, a "segment" column, an "average process time" column, and a "rate of increase" column.

In the "tier" column, identifiers of the tiers are set. In the "segment" column, the segment types for the corresponding tiers are set. In the "average process time" column, the average value of the process times in the corresponding segment in the corresponding tier is set in units of milliseconds.

In the "rate of increase" column, a rate of increase in the average process time in the abnormal state relative to the average process time in the normal state is set.

Data as indicated by the process-time management table 153c illustrated in FIG. 18 is obtained, for example, 14 times at intervals of one minute. Each time the data is obtained, a new process-time management table is additionally stored in the abnormal-state process-time storage unit 153a.

When reference is now made to the rates of increase which are illustrated in FIG. 18, the rate of increase in the process time with respect to tier 1 does not exceed the specified threshold (2.0 in this example). On the other hand, with respect to tier 2 and tier 3, the rates of increase in the process time exceeds the threshold.

In this case, in operation S61 in FIG. 13, with respect to tier 2, a determination is made as to whether or not the process time in only the "pre-query-start" segment (the first type of segment) has increased. In the example of FIG. 18, it is determined that the process times in all segments have increased, and the process proceeds to operation S63. With respect to tier 3, the determination processing in operation S61 in FIG. 13 is not performed, since tier 3 has no "pre-query-start" segment (the first type of segment).

Figure 19:
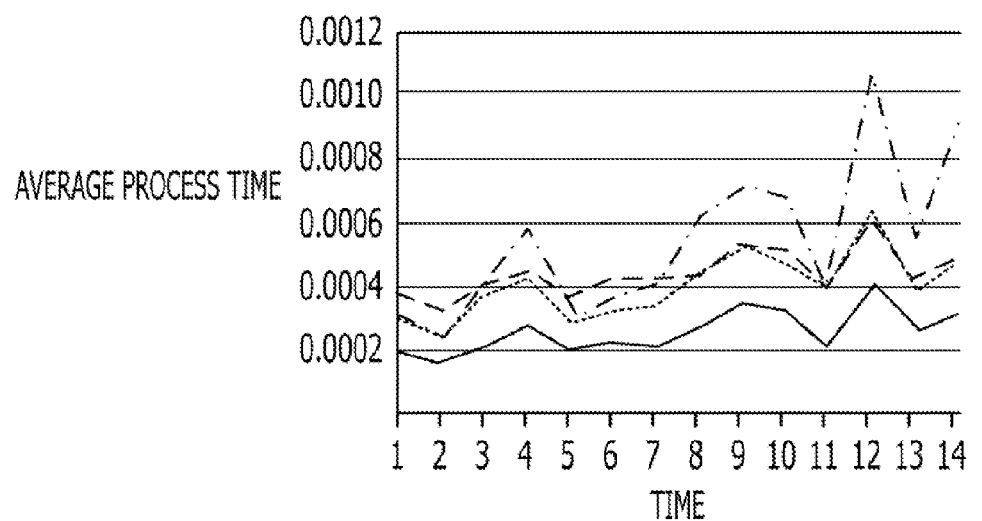
FIG. 19 illustrates time-series changes in the process time in an abnormal state.

FIG. 19 illustrates time-series changes in the process times in the abnormal state. In FIG. 19, the time-series changes in the process times in the abnormal state are illustrated in a graph with the horizontal axis indicating time and the vertical axis indicting an average process time.

The time-series changes illustrated in FIG. 19 are of the app server 300 and the DB server 400. Although the time-series changes are analyzed using the "multiple queries" segment (the second type of segment) as the representative segment, the time-series changes in the "pre-query-start" segment (the first type of segment) and the "post-querycompletion" segment (the third type of segment) are also illustrated in the example of FIG. 19 for convenience of reference.

In operation S65 in FIG. 13, on the basis of the time series changes, the abnormal-state process-time analyzer 153 calculates, with respect to the tiers in which the process times have increased, the correlation coefficient for the correlation between the time-series changes in the process times in the representative segments. The calculated correlation coefficients are stored in the abnormal-state correlation-coefficient storage unit 153b.

FIG. 20 illustrates one example of the data structure of the abnormal-state correlation-coefficient storage unit. For example, a correlation-coefficient management table 153d is stored in the abnormal-state correlation-coefficient storage unit 153b. The correlation-coefficient management table 153d has a "higher tier" column, a "lower tier" column, and a "correlation coefficient" column. In the corresponding columns, the same types of information as those in the columns having the same names in the correlation-coefficient management table 152d in the normal-state correlation-coefficient storage unit 152b illustrated in FIG. 17 are set.

In the abnormal state, the correlation coefficient for the correlation between the tiers in which the rates of increase in the process times are larger than the specified value is calculated. Accordingly, in the example of FIG. 20, only the correlation coefficient for the correlation between the tier 2 and the tier 3 is determined.

The correlation determiner 154 determines whether or not an influence propagates, on the basis of the correlation coefficient for the normal state and the correlation coefficient for the abnormal state. When the correlation coefficient for the abnormal state is larger than the threshold (i.e., the determination in operation S66 in FIG. 13 is YES) and the correlation coefficient for the normal state is smaller than or equal to the threshold (i.e., the determination in operation S68 in FIG. 13 is NO), the correlation determiner 154 determines that an influence propagates.

In this case, when the correlation coefficient for the correlation between the tiers exceeds the certain threshold, it is determined that the fluctuations in the process times in both of the tiers have a significant correlation. The threshold for determining the presence/absence of a significant correlation is statistically determined based on the length (the sample size) of the time sequence for the comparison.

In order to prove that the obtained correlation coefficient is statistically significant, t-test may be performed. Given the correlation coefficient for a population=0 (null hypothesis), the correlation coefficient r of samples follows a t-distribution with n−2 degrees of freedom (n is the sample size), for t expressed by:

$$t = \frac{r\sqrt{n-2}}{\sqrt{1-r^2}} \quad (2)$$

In the t-distribution, when the sample size is 14, the limit value at a significance level of 1% is 0.661. That is, it is understood that, when the sample size is 14 as illustrated in FIGS. 16 and 19, the population correlation coefficient is not 0 (i.e., the null hypothesis is rejected) at a significance level of 1% for a correlation coefficient of 0.661 or greater. This means that the correlation is significant for a correlation coefficient of 0.661 or greater. This indicates that, for comparison of per-minute average values for a period of 14 minutes, as in the second embodiment, a threshold of 0.661 is appropriate for determining the presence/absence of a correlation in increases in the process times between the multiple tiers. The threshold may also be 0.66, using up to two digits to the right of the decimal point.

In the example of FIG. 17, the correlation coefficient for the time-series changes in the upper tier "tier 2: multiple queries" and the lower tier "tier 3: overall process time" in the normal state is 0.448. Thus, since this value of the correlation coefficient is smaller than 0.661, a significant correlation between tier 2 and tier 3 in the normal state is not recognized.

In the example of FIG. 20, the correlation coefficient for the time-series changes in the upper tier "tier 2: multiple queries" and the lower tier "tier 3: overall process time" in the abnormal state (i.e., a state when the process time increases) is 0.986. Thus, since this value of the correlation coefficient is greater than 0.66, there is a significant correlation between tier 2 and tier 3 in the abnormal state.

In such a manner, with respect to the multiple tiers between which no significant coefficient is found in the normal state and a significant coefficient is found in only the abnormal state, it is determined that there is a cause-and-effect relationship in that an abnormality-induced increase in the process time in the lower tier propagates to the upper tier. A result of the determination is displayed on, for example, the monitor 11.

Figure 21:
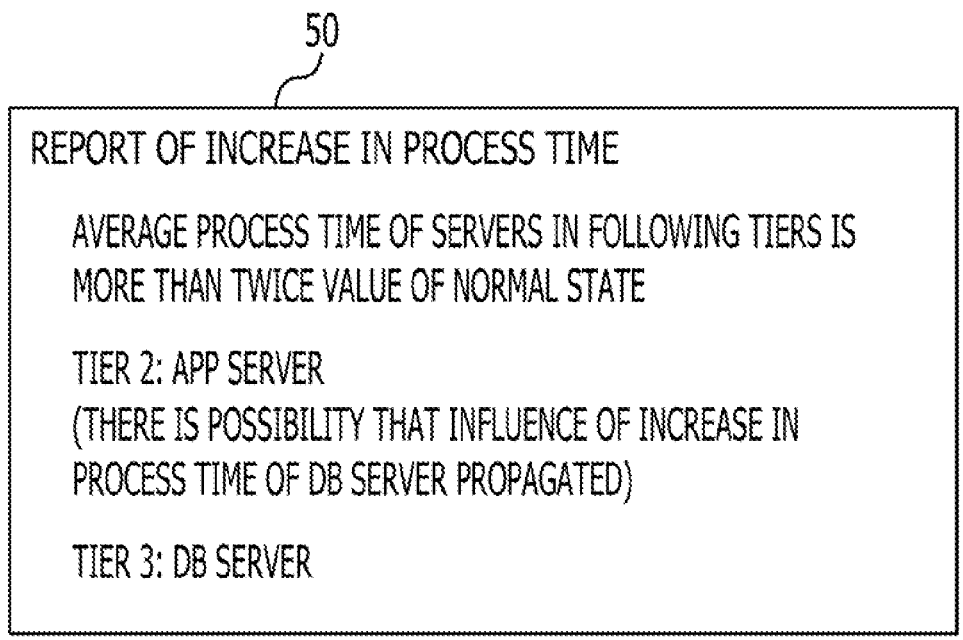
FIG. 21 illustrates one example of an abnormality alarming screen.

FIG. 21 illustrates one example of an abnormality alarming screen. An abnormality alarming screen 50 indicates, for example, a list of tiers having abnormalities in which the rate of increase in the process time is 2.0 or more. With respect to the tier having a process-time increase that was possibly caused by only the propagation of an influence of an increase in the process time of the server in the lower tier, a message to that effect is displayed.

Upon viewing the abnormality alarming screen 50 indicating such a message, the administrator recognizes that the process times of the app server 300 and the DB server 400 have increased excessively compared to those in the normal state and the cause of the increases in the process times lies in only the DB server 400. That is, the administrator recognizes that, although the process time of the app server 300 has increased, the abnormality can be reduced or eliminated by taking measures for the DB server 400 to reduce or eliminate the state of the increase in the process time without taking measures for the app server 300.

As described above, in the second embodiment, the cause-and-effect relationship is determined based on the correlation coefficient for the time-series changes in the average process time. That is, in the second embodiment, the "multiple queries" segments in two tiers are selected with priority as the representative segments. A correlation coefficient for the time-series changes in the process times in the representative segment is determined. When only the correlation coefficient for the abnormal state is larger than or equal to a threshold (e.g., 0.8), it is determined that the increases in the process times in the two tiers have a cause-and-effect relationship. When the correlation coefficient for the abnormal state is larger than the threshold and the correlation coefficient for the normal state is also larger that the threshold, this means that they are correlated independently from the increases in the process times (e.g., are correlated with each other in terms of variations in the input load). Thus, it is determined that the increases in the process times have no cause-and-effect relationship.

A reason why such a determination is made as to a cause-and-effect relationship between the increases in the process times in the tiers will be described below. One reason why an increase in the process time propagates to another tier can be attributed to a case in which an increase in the process time in one tier causes multiplicity of processing in the tier higher than that tier to increase, which leads to an increase in the load and an increase in the waiting time. In such a case, a change in the process time in the lower tier is correlated with the change in the multiplicity of processing in the upper tier, which correlation is further correlated with a change in the process time in the tier, meaning that the changes in the process times in the two tiers have a correlation. In this case, however, attention is paid to an increase in the "pre-start-query" segment (the first type of segment). The process time in the "pre-start-query" segment may increase prominently for various reasons. One example of the reasons is a time for waiting for a connection to be established with the lower tier. The time spent for processing other than general processing increases/decreases, greatly exceeding a subtle process-time fluctuation caused by an increase/decrease in the multiplicity of processing. Thus, if an inter-tier correlation in the process times to which the process time of such a "pre-start-query" segment is added is measured, a completely irrelevant result is produced. The segment that is least affected by such processing is the "multiple queries" segment, and thus, the use of only the "multiple queries" segment to reduce or eliminate the correlation makes it possible to measure a correlation for the process load fluctuation between the tiers.

There are also cases in which a plurality of "multiple queries" segments (the second type of segment) exists in one transaction. Such a case occurs when a request message from a higher tier is transmitted three times or more in a message flow. The reason why an average value of the process times in the plurality of "multiple queries" segments is used is that a total value of the process times is substantially proportional to the number of messages. When the average number of messages changes in a time sequence, this change alone results in a correlation between the total values in the process times in the multiple tiers in the "multiple queries" segments. Accordingly, in the second embodiment, an average value of the process times in the plurality of "multiple queries" segments is used as the process time in the "multiple queries" segment in the transaction.

As described above, in the second embodiment, when process times in two tiers increase substantially simultaneously, a determination is made as to whether both of the tiers have problems or whether one of the tiers has a problem affecting the other. Knowing that there is a cause-and-effect relationship makes it possible to readily understand the direction of the cause-and-effect relationship (i.e., which server acts as a cause and which server acts as an effect). In the case of a multi-tier system, the lower tier generally affects the upper tier. Thus, it is sufficient to check only the lower tier. In such a case, if the administrator carries on the checking based on a misunderstanding that both tiers have causes, then an excessive amount of time may be taken to check both the tiers, an unnecessary purchase of hardware for both of the tiers may be made for replacement, or cause analysis may be disrupted to result in a failure of determination of a problem cause. The use of the technology of the present embodiment makes it possible to prevent such situations.

Third Embodiment

A third embodiment is adapted to be capable of appropriately determining a cause-and-effect relationship between tiers even when the system is running stably at high load.

In the scheme in the second embodiment, the presence/absence of a cause-and-effect relationship in increases in the process times is determined assuming a phenomenon as described below.

When the load of the server in the tier increases to cause a bottleneck, the process time of the server in the tier increases while fluctuating. In this case, multiplicity of processing of the server in the upper tier fluctuates according to an increase/decrease in the process time of the server in the lower tier. Such fluctuations in the multiplicity of the process induce fluctuations in the amount of load. In the second embodiment described above, such a phenomenon is utilized to determine the presence/absence of a cause-and-effect relationship between the increases in the process times in the tiers.

If, however, the amount of load increases excessively, multiplicity of a connection between the bottleneck tier and the tier higher than that increases endlessly. When the multiplicity increases continuously, it eventually encounters the limit of the multiplicity at some point. That is, since the upper limit of the connection multiplicity is preset, a connection exceeding the upper limit is not established.

Upon reaching the limit of the multiplicity, the multiplicity does not increase any more, so that the load in the bottleneck tier is stabilized. That is, the process time in the bottleneck tier becomes stable although it displays a large value. In addition, the distribution of the process times is reduced. As is apparent from equation (1) for determining the correlation coefficient, the correlation coefficient decreases as the distribution is reduced.

When the limit of the connection multiplicity is reached, the limit of the multiplicity reduces or prevents behavior of an increase/decrease in the process time in the lower tier from being transmitted to the upper tier in the form of an increase/decrease in the multiplicity. Thus, even when an increase/decrease in the process time occurs in the lower tier, the influence of the increase/decrease does not reach the upper tier. Thus, even when the process time is not stable, fluctuations in the process times in the individual tiers become uncorrelated with each other. Accordingly, the scheme according to the second embodiment is effective while the process time is increasing after a bottleneck occurs, but may not work effectively after the limit of the multicity is reached.

In an actual system, however, such a high level of load rarely continues, since the input load increases/decreases without becoming stable. In many cases, the load decreases partially, causing the process times to increase/decrease to thereby generate a correlation.

In the third embodiment, therefore, the time sequence to be used is limited to a partial time sequence, so that, when a segment in which the load varies greatly exists, a cause-and-effect relationship is determined appropriately.

Figure 22:
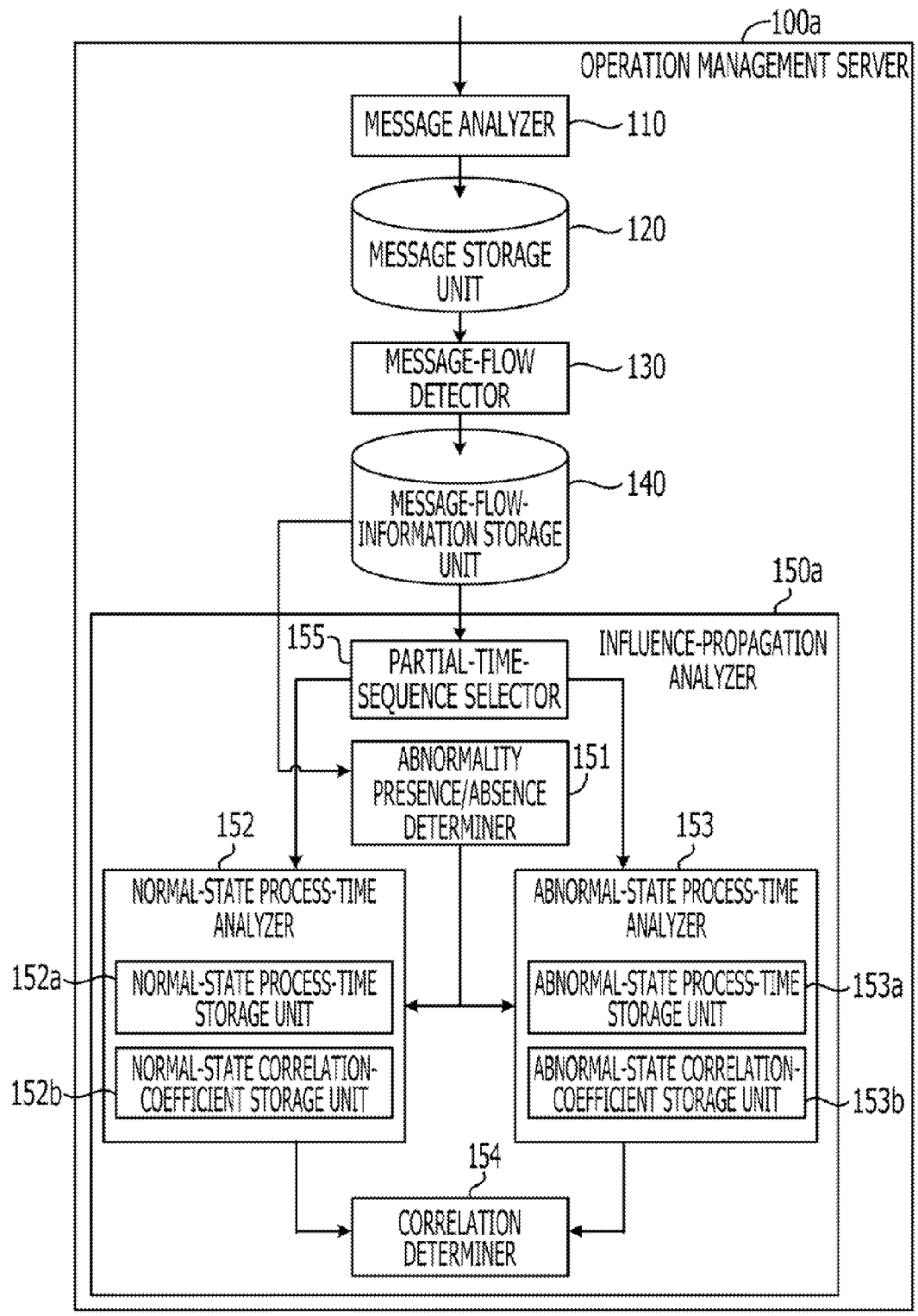
FIG. 22 is a block diagram illustrating the functional configuration of an operation management server in a third embodiment.

FIG. 22 is a block diagram illustrating the functional configuration of the operation management server in the third embodiment. In an operation management server 100a illustrated in FIG. 22, elements having functions that are substantially similar to those of the operation management server 100 described above in the second embodiment and illustrated in FIG. 4 are denoted by the same reference characters as those in FIG. 4, and descriptions thereof are not given hereinafter.

The operation management server 100a according to the third embodiment has an influence-propagation analyzer 150a, which includes a partial-time-sequence selector 155. The partial-time-sequence selector 155 determines a relationship between a load input to the system and a standard deviation of the average process time for each specified period. The partial-time-sequence selector 155 sets, as an exclusion time slot, a time slot in which the input load is larger than the input load in the period in which the standard deviation of the average process time is the largest. The partial-time-sequence selector 155 then excludes the exclusion time slot from time slots for analyzing changes in the process times. For example, the partial-time-sequence selector 155 passes, from the message-flow-information storage unit 140 to the normal-state process-time analyzer 152 and the abnormal-state process-time analyzer 153, the message flow information from which the message flow information regarding a transaction in the exclusion time slot is excluded. By using the partial time sequence obtained based on the message flow information received from the partial-time-sequence selector 155, the normal-state process-time analyzer 152 and the abnormal-state process-time analyzer 153 analyze a correlative relationship.

On the basis of the load input to the system and the standard deviation of the average process times, the partial-time-sequence selector 155 detects a state in which the amount of load of the system increases excessively and the process time does not fluctuate (i.e., the system is stable at a high load value).

Figure 23:
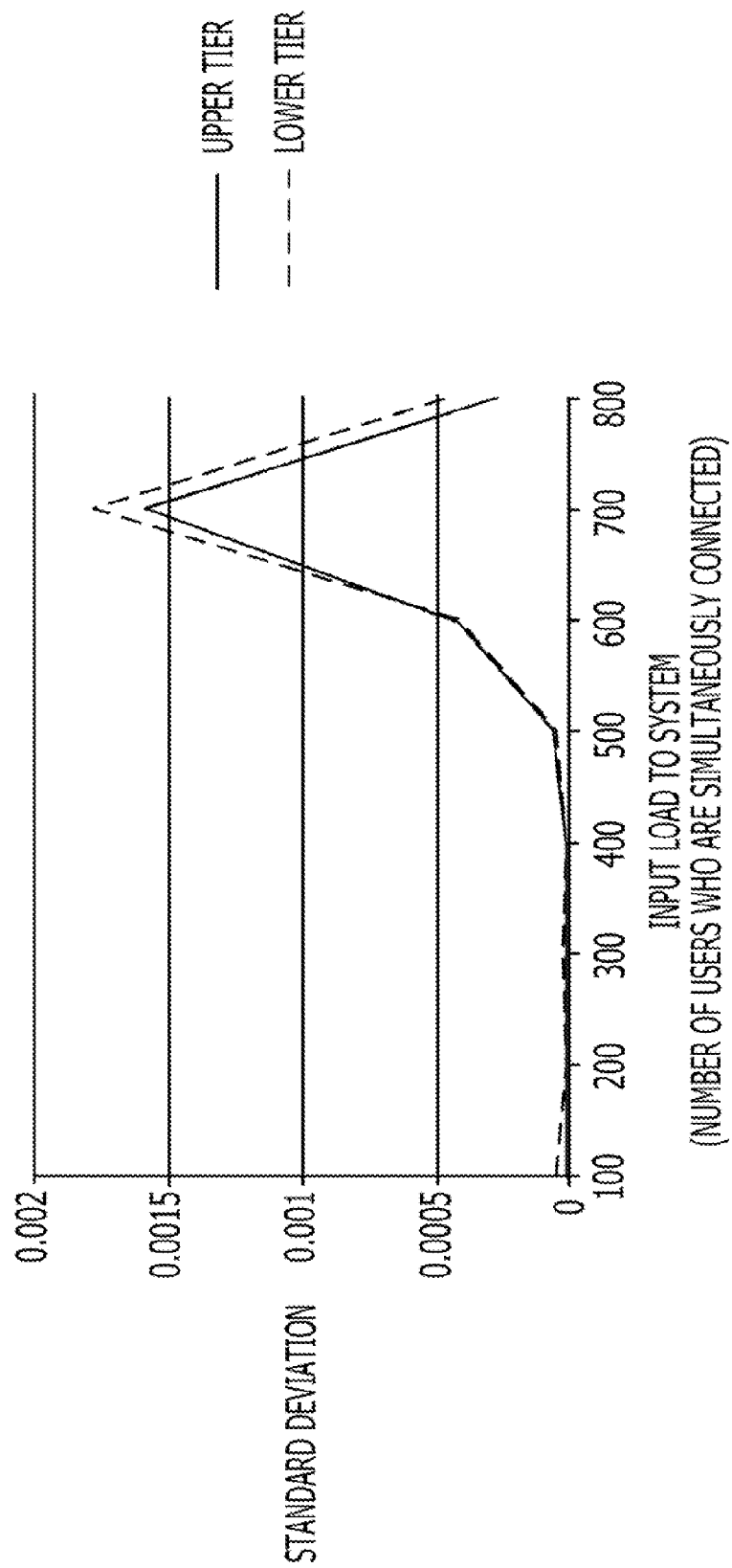
FIG. 23 depicts a relationship between a load input to the system and the standard deviation of an average process time.

FIG. 23 depicts a relationship between a load input to the system and the standard deviation of an average process time. In FIG. 23, the load input to the system is indicated at the horizontal axis and the standard deviation is indicated at the horizontal axis.

In FIG. 23, the load input to the system is represented by the number of process requests that have transmitted from the terminal apparatus and have reached the server in the upper tier. That is, the load input to the system is expressed by the number of request messages input to the web server 200 within a unit time.

The standard deviation is a standard deviation of the average process time in the representative segment in the lower one of multiple tiers in which increases in the process times are problematic. The partial-time-sequence selector 155 calculates an average process time, for example, for every five seconds. In addition, the partial-time-sequence selector 155 calculates the standard deviation on the basis of the average process times of 12 five-second segments in each one-minute time slot. Consequently, the standard deviation for every one minute is obtained.

The partial-time-sequence selector 155 also counts the number of request messages input to the web server 200 in the highest tier in a specified time slot (for one minute) for which the standard deviation was calculated. In FIG. 23, the values of the standard deviation are plotted for each counted number of request messages.

It can be seen from FIG. 23 that, as the input load increases, the standard deviation increases until the input load reaches a certain value. This is a natural change involved in an increase in the average process time. However, when the input load exceeds the certain value, the standard deviation suddenly begins to decrease. This means that the input load increases excessively to thereby reduce the width of fluctuations in the process time.

In an actual system, the input load varies from moment to moment. Accordingly, the partial-time-sequence selector 155 divides the period of analysis into unit times each having, for example, about one minute and determines an average load input of the system in the unit times and the standard deviation of average process times in the unit times in each segment in each tier.

Figure 24:
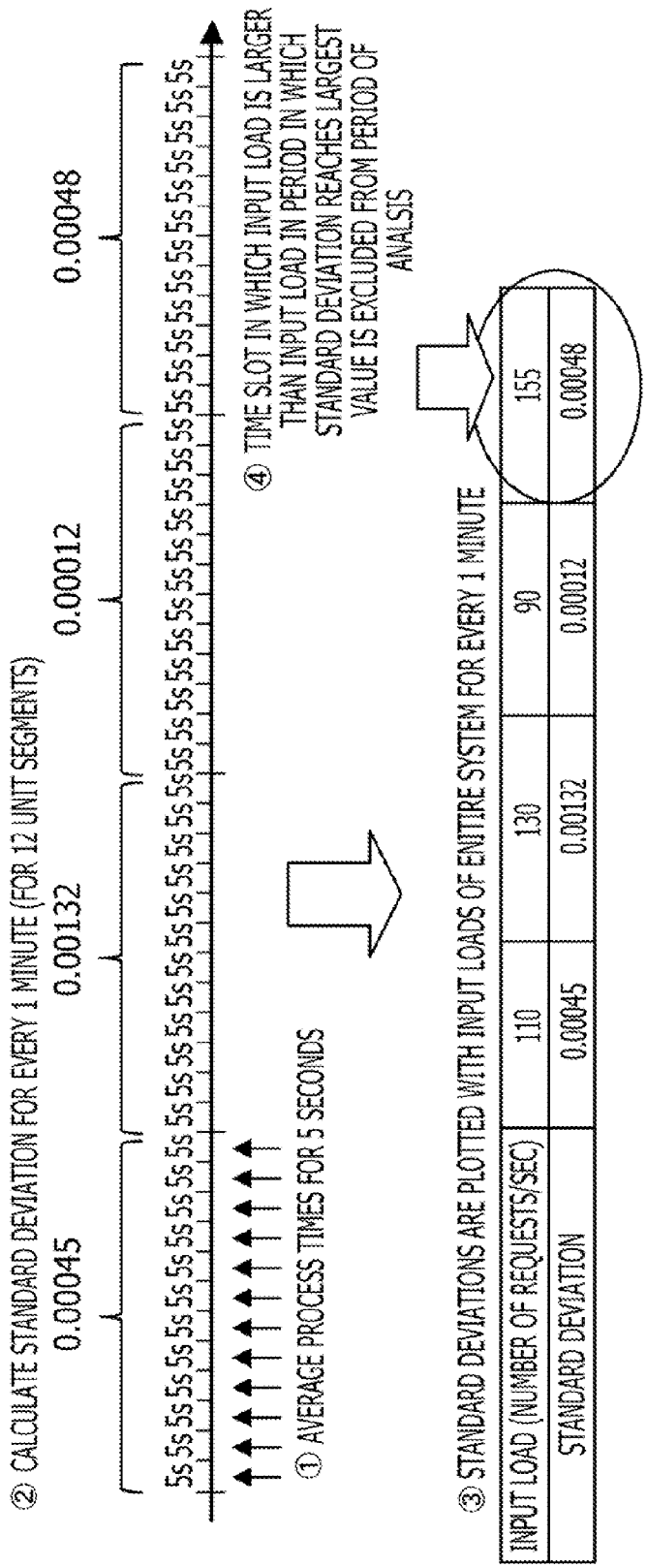
FIG. 24 depicts an example of analysis of a relationship between the input loads and the standard deviations.

FIG. 24 depicts an example of analysis of a relationship between the input loads and the standard deviations. First, the partial-time-sequence selector 155 generates 12 unit periods per minute, with a time axis being divided at intervals of five seconds. Next, on the basis of the message flow information stored in the message-flow-information storage unit 140, the partial-time-sequence selector 155 calculates, for each unit period, an average process time of processes for the representative segment in each tier.

The partial-time-sequence selector 155 further determines the standard deviation of the average process times of the 12 unit periods in each selection-target period, which is one-minute time slot. That is, such a standard deviation is determined for every one minute. In the example of FIG. 24, standard deviations of 0.00045, 0.00132, 0.00012, and 0.00048 are obtained.

Upon obtaining the standard deviation, the partial-time-sequence selector 155 determines the input load (e.g., the number of request messages per second) for each selection-target period, on the basis of the message flow information stored in the message-flow-information storage unit 140. The partial-time-sequence selector 155 then associates the input load and the standard deviation for each selection-target period. Although FIG. 24 illustrates only four analysis segments, the analysis is executed for a certain length of time segment (e.g., 14 minutes). The relationship between the input loads and the standard deviations are plotted as in the table illustrated in FIG. 23.

Figure 25:
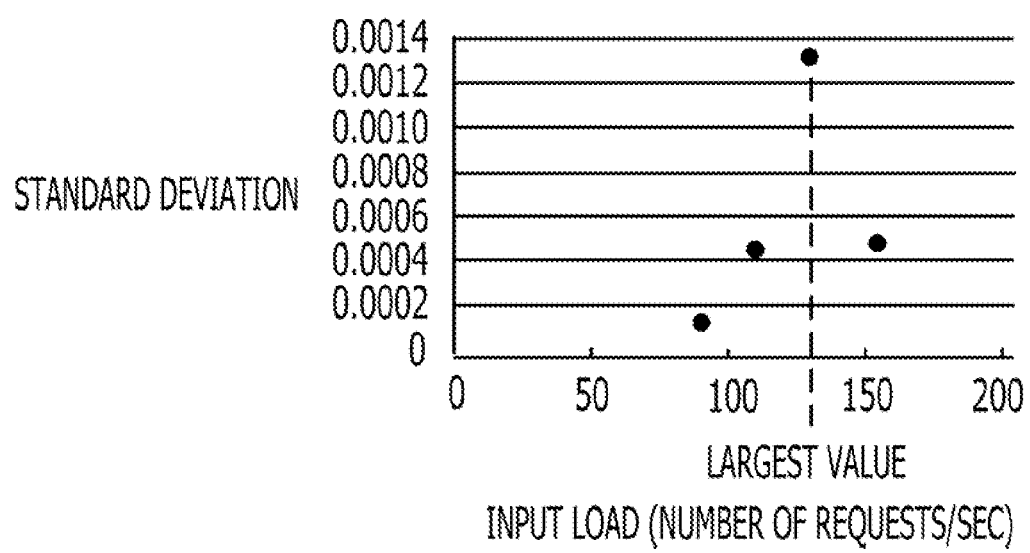
FIG. 25 is a graph depicting an example of a result obtained by plotting the relationship between the input loads and the standard deviations.

FIG. 25 is a graph depicting an example of a result obtained by plotting the relationship between the input loads and the standard deviations. In the thus-obtained graph, in a range in which the input load is larger than the input load when the standard deviation reached its largest value, the load of the system becomes so large that the process time does not increase/decrease.

In the examples illustrated in FIGS. 24 and 25, the standard deviation reaches the largest value when the input load is 130. Thus, the time slot in which the input load is larger than 130 is excluded from the time slots for analyzing the process time changes. In the example of FIG. 24, the time slot in which the result of the standard deviation calculation is 0.00048 is excluded from the time slots for analyzing the process time changes.

The normal-state process-time analyzer 152 and the abnormal-state process-time analyzer 153 determine a partial time sequence for process time changes by using only the time slots that are not excluded by the partial-time-sequence selector 155. This arrangement makes it possible to perform analysis reducing or eliminating an influence of the time slot in which the load of the system is excessive.

When the process times increase in multiple tiers, there is no particularly stringent rule about on which of the tiers the partial-time-sequence selection processing is to be performed. When the process times in the two tiers are associated with each other, fluctuations in both of the increases in the process times should be substantially similar to each other. Thus, a substantially similar result is obtained, regardless of whichever tier the above-described procedure is performed on. The partial-time-sequence selector 155 in the third embodiment first executes the partial-time-sequence selection processing on the lower tier and then extracts the partial time sequence of the average process time in the upper tier in a previously selected time slot. Utilization of the thus-obtained partial time sequence of the average process times in both of the tiers allows a correlative relationship to be determined with a scheme that is substantially the same as the scheme in the second embodiment.

Figure 26:
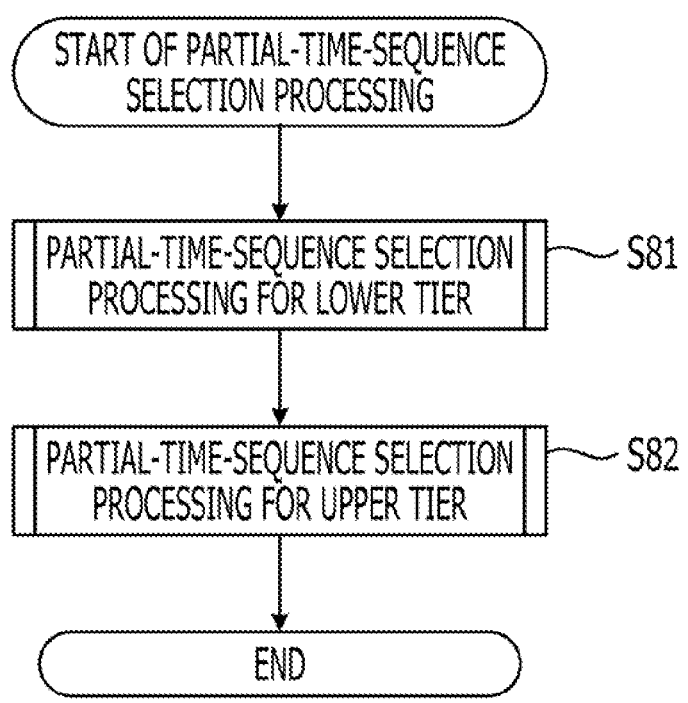
FIG. 26 is a flowchart illustrating an example of a procedure of partial-time-sequence selection processing.

FIG. 26 is a flowchart illustrating an example of a procedure of the partial-time-sequence selection processing. The processing illustrated in FIG. 26 will now be described along with operation numbers.

In operation S81, the partial-time-sequence selector 155 performs partial-time-sequence selection processing on the lower tier.

In operation S82, the partial-time-sequence selector 155 performs partial-time-sequence selection processing on the upper tier.

Such partial-time-sequence selection processing is executed for each combination of an upper tier and a lower tier. For example, for analysis of influence propagation between the DB server 400 and the app server 300, the processing illustrated in FIG. 26 is executed regarding the DB server 400 as the server in the lower tier and the app server 300 as the server in the upper tier. For example, for analysis of influence propagation between the app server 300 and the web server 200, the processing illustrated in FIG. 26 is executed regarding the app server 300 as the server in the lower tier and the web server 200 as the server in the upper tier.

Figure 27:
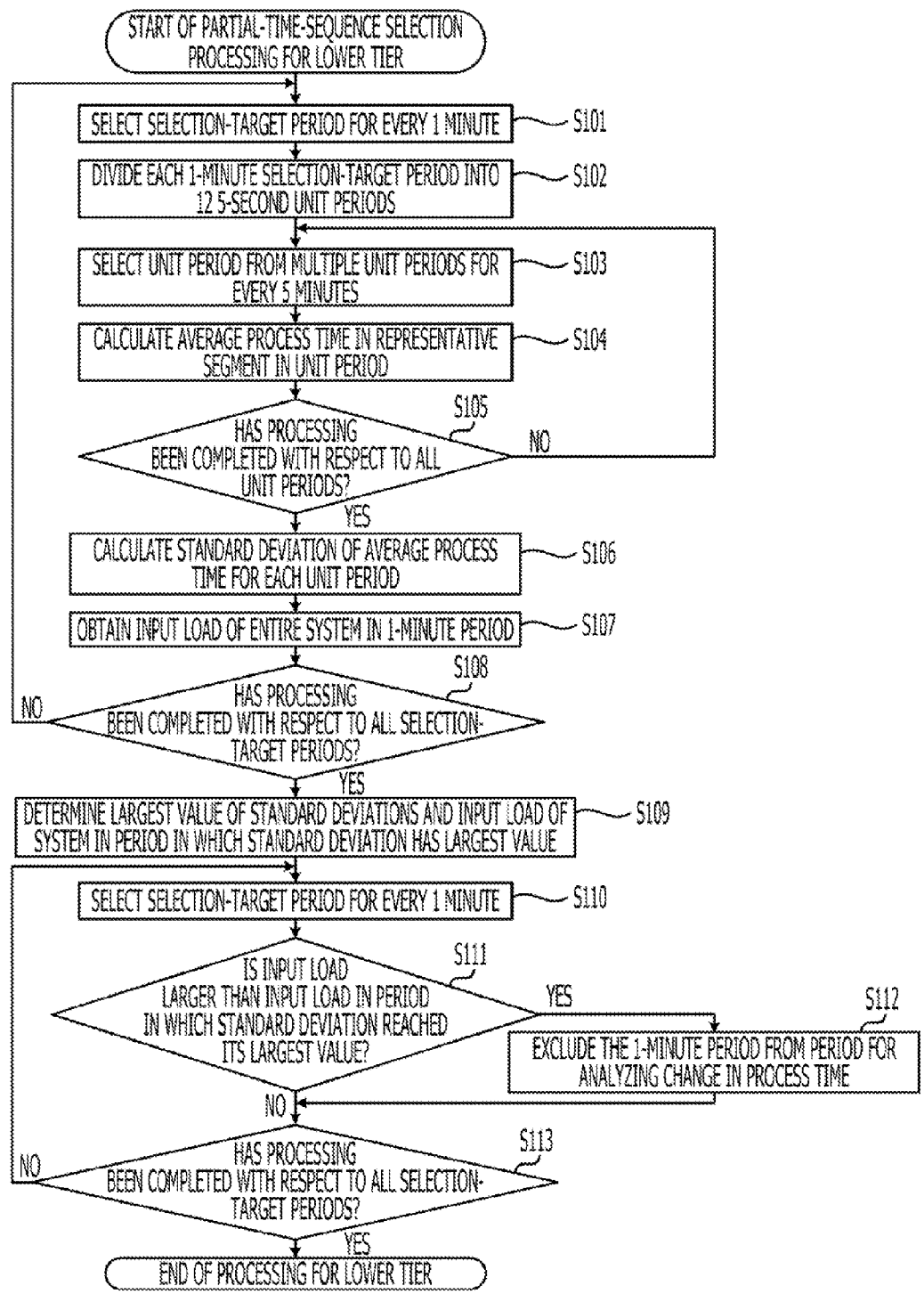
FIG. 27 is a flowchart illustrating an example of a procedure of partial-time-sequence selection processing for the lower tier.

FIG. 27 is a flowchart illustrating an example of the procedure of the partial-time-sequence selection processing for the lower tier. The processing illustrated in FIG. 27 will now be described along with operation numbers.

The partial-time-sequence selector 155 executes processing in operations S102 to S107 for each of the one-minute selection-target periods, which are obtained by dividing the period of analysis (e.g., 14 minutes). Thus, in operation S101, the partial-time-sequence selector 155 selects one unprocessed selection-target period from the multiple selection-target periods.

In operation S102, the partial-time-sequence selector 155 divides the one-minute selection-target period into 12 five-second unit periods.

In operation S103, the partial-time-sequence selector 155 executes processing in operation S104 for each five-second unit period. That is, the partial-time-sequence selector 155 selects one unprocessed unit period from the multiple unit periods obtained by dividing the selected selection-target period.

In operation S104, the partial-time-sequence selector 155 calculates an average process time in the lower tier in the selected unit period in the representative segment.

In operation S105, the partial-time-sequence selector 155 determines whether or not the processing in operation S104 has been completed with respect to all unit periods in the selected selection-target period. When an unprocessed unit period exists, the partial-time-sequence selector 155 returns the process to operation S103. When the processing in operation S104 has been completed with respect to all unit periods, the partial-time-sequence selector 155 advances the process to operation S106.

In operation S106, the partial-time-sequence selector 155 calculates a standard deviation of the average process time for each unit period in the selection-target period.

In operation S107, the partial-time-sequence selector 155 obtains the input load of the entire system in the one-minute selection-target period. The input load is represented by the number of request messages per second.

In operation S108, the partial-time-sequence selector 155 determines whether or not the processing in operations S102 to S107 has been completed with respect to all one-minute selection-target periods. When an unprocessed selection-target period exists, the partial-time-sequence selector 155 returns the process to operation S101. When the processing in operations S102 to S107 has been completed with respect to all selection-target periods, the partial-time-sequence selector 155 advances the process to operation S109.

In operation S109, the partial-time-sequence selector 155 determines the largest value of the standard deviations in the selection-target period and the input load of the system in the selection-target period in which the standard deviation has the largest value.

The partial-time-sequence selector 155 executes processing in operations S111 and S112 for each one-minute selection-target period. Thus, in operation S110, the partial-time-sequence selector 155 selects one unprocessed selection-target period from the multiple selection-target periods.

In operation S111, the partial-time-sequence selector 155 determines whether or not the input load in the selection-target period to be processed is larger than the input load in the selection-target period in which the standard deviation reached its largest value. When the input load in the selection-target period to be processed is larger than the input load in the selection-target period in which the standard deviation reached its largest value, the process proceeds to operation S112. When the input load in the selection-target period to be processed is smaller than the input load in the selection-target period in which the standard deviation reached its largest value, the process proceeds to operation S113.

In operation S112, the partial-time-sequence selector 155 excludes currently processed one-minute selection-target period from the period of time for analyzing a change in the process time.

In operation S113, the partial-time-sequence selector 155 determines whether or not the processing in operations S111 and S112 has been completed with respect to all one-minute selection-target periods. When an unprocessed selection-target period exists, the partial-time-sequence selector 155 returns the process to operation S110. When the processing in operations S111 and S112 has been completed with respect to all selection-target periods, the partial-time-sequence selector 155 ends the partial-time-sequence selection processing for the lower tier.

Figure 28:
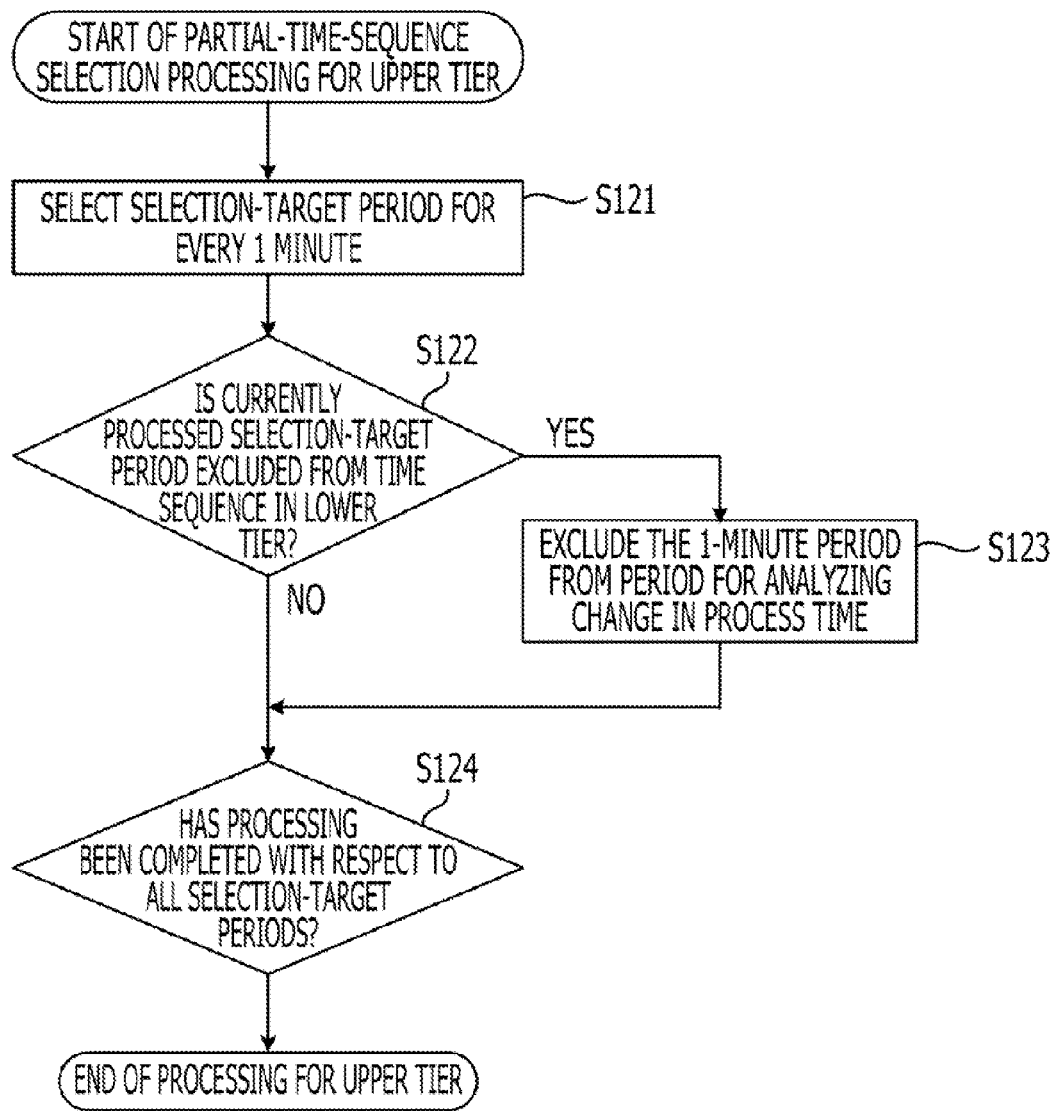
FIG. 28 is a flowchart illustrating an example of a procedure of partial-time-sequence selection processing for the upper tier.

FIG. 28 is a flowchart illustrating an example of the procedure of the partial-time-sequence selection processing for the upper tier. The processing illustrated in FIG. 28 will now be described along with operation numbers.

The partial-time-sequence selector 155 executes processing in operations S122 to S123 for each of the one-minute selection-target periods, which are obtained by dividing the period of analysis (e.g., 14 minutes). Thus, in operation S121, the partial-time-sequence selector 155 selects one unprocessed selection-target period from the multiple selection-target periods.

In operation S122, the partial-time-sequence selector 155 determines whether or not the currently processed selection-target period is excluded from the period of time for analyzing a change in the process time in the lower tier. When the selection-target period is excluded, the process proceeds to operation S123. When the selection-target period is not excluded, the process proceeds to operation S124.

In operation S123, the partial-time-sequence selector 155 excludes the currently processed selection-target period from the period of time for analyzing a change in the process time.

In operation S124, the partial-time-sequence selector 155 determines whether or not the processing in operations S122 and S123 has been completed with respect to all selection-target periods in the period of analysis. When an unprocessed selection-target period exists, the partial-time-sequence selector 155 returns the process to operation S121. When the processing in operations S122 and S123 has been completed with respect to all selection-target periods, the partial-time-sequence selector 155 ends the partial-time-sequence selection processing for the upper tier.

The message flow information obtained in the time sequence that is not excluded in the above-described processing is passed from the partial-time-sequence selector 155 to the normal-state process-time analyzer 152 and the abnormal-state process-time analyzer 153 and is used for the analysis of time-series changes. As a result, the normal-state process-time analyzer 152 and the abnormal-state process-time analyzer 153 generate time-series changes from which information regarding a part of the periods is excluded.

As described above, in the third embodiment, the time slot in which the input load increases excessively and the process time is stabilized by restriction of the connection multiplicity is excluded from the period of analysis. Consequently, even when a state in which the input load is large continues, a determination is adequately made as to whether or not an influence propagates.

Other Application Examples

The functions of the above-described processing may be realized by a computer. In such a case, a program in which details of processing for the functions that should be included in the operation management server are written is provided. When the program is executed by the computer, the above-described processing functions are realized on the computer. The program in which the details of the processing are written may be recorded to a computer-readable recording medium. Examples of the computer-readable recording medium include a magnetic storage device, an optical disk, a magneto-optical recording medium, and a semiconductor memory. Examples of the magnetic storage device include a HDD, a flexible disk (FD), and a magnetic tape. Examples of the optical disk include a DVD, DVD-RAM, and CD-ROM/RW. One example of the magneto-optical recording medium is an MO (magneto-optical) disk.

For distribution of the program, portable recording media (such as DVDs and CD-ROMs) on which the program is recorded may be made commercially available. The program may also be stored in a storage device in a server computer so that the program can be transferred therefrom to another computer through a network.

A computer that executes the program may store, in the storage device thereof, the program recorded on the portable recording medium or the like or transferred from the server computer. The computer then reads the program from the storage device thereof and executes processing according to the program. The computer may also directly read the program from the portable recording medium and execute the processing according to the program. In addition, each time the program is transferred from the server computer, the computer may sequentially execute the processing according to the received program.

At least one of the above-described processing functions may also be implemented by an electronic circuit, such as a DSP (digital signal processor), an ASIC (application specific integrated circuit), or a PLD (programmable logic device).

Although the embodiments have been described above by way of example, the configuration of each element in the embodiments may be replaced with another element having substantially the same function. Any other element or process may also be added. Additionally, two or more arbitrary elements (or features) in the above-described embodiments may also be combined.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing an analysis program that causes a computer to execute a procedure, the procedure comprising:

calculating a time-series change in an average process time per process of a server belonging to a first tier of a plurality of tiers and a time-series change in an average process time per process of a server belonging to a second tier of the plurality of tiers, referring to a storage unit that stores, with respect to each transaction executed in a multi-tier system in which a plurality of servers coordinate with each other to execute the transaction, information indicating periods in which the server in each of the plurality of tiers executes processes for the transaction; and determining the presence/absence of a correlation between the time-series change in the average process time of the server belonging to the first tier and the time-series change in the average process time of the server belonging to the second tier.

2. The computer-readable, non-transitory medium according to claim 1, the procedure further comprising:

determining, by referring to the storage unit, the presence/absence of an abnormality in the multi-tier system on a basis of a time from when the server in a highest tier of the plurality of tiers receives a process request until the server in the highest tier transmits a response;

determining, by referring to the storage unit, whether or not the average process time per process of the server belonging to each of the plurality of tiers in the period in which an abnormality is detected has increased by a specified value or more than the average process time per process in which no abnormality is detected, and calculating the time-series change in the average process time per process in the period in which the abnormality is detected and the time-series change per process in the period in which no abnormality is detected, by regarding, as the first tier and the second tier, two tiers in which the process times have increased by the specified value or more; and determining the presence/absence of a cause-and-effect relationship between an increase in the process time per process of the server belonging to the first tier and an increase in the process time per process of the server belonging to the second tier, on a basis of a correlation between the time-series change in the process time of the server belonging to the first tier and the time-series change in the process time of the server belonging to the second tier in the period in which the abnormality is detected and a correlation between the time-series change in the process time of the server belonging to the first tier and the time-series change in the process time of the server belonging to the second tier in the period in which no abnormality is detected.

3. The computer-readable, non-transitory medium according to claim 2, wherein, when it is determined that a correlation is present in the period in which the abnormality is detected and it is determined that no correlation is present in the period in which no abnormality is detected, it is determined in the procedure of determining the presence/absence of the cause-and-effect relationship that a cause-and-effect relationship exists between the increases in the process times.

4. The computer-readable, non-transitory medium according to claim 1, wherein, in the procedure of calculating the time-series changes, when the server belonging to the first tier or the server belonging to the second tier outputs a process request to the server in a lower tier during processing corresponding to a process request from the server in a higher tier, each of the processes is classified into a corresponding one of multiple types in accordance with a communication that triggers start of the process and a communication that is performed at end of the process and an average of the process times of execution periods of the processes belonging to at least one type selected from the multiple types is used as the average process time per process of the server belonging to the first tier or the server belonging to the second tier.

5. The computer-readable, non-transitory medium according to claim 4, wherein the multiple types classified in the procedure for the classification include: a first type to which a process that is triggered by a process request input from the server in an upper tier and that is ended upon output of a process request to the server in the lower tier belongs; a second type to which a process that is triggered by a response transmitted from the server in the lower tier in response to a process request output to the server in the lower tier and that is ended upon output of a process request to the server in the lower tier belongs; and a third type to which a process that is triggered by a response transmitted from the server in the lower tier in response to a process request output to the server in the lower tier and that is ended upon output of a response to the server in the upper tier belongs.

6. The computer-readable, non-transitory medium according to claim 5, wherein, when an execution period belonging to the second type exists, an average of the process times of execution periods of processes belonging to the second type is set as the average process time per process of the server belonging to the first tier or the server belonging to the second tier.

7. The computer-readable, non-transitory medium according to claim 2, the procedure further comprising:
calculating, during determination as to whether or not the process time of the server belonging to each of the plurality of tiers has increased, a rate of increase in the average process time per process when the abnormality is detected relative to the average process time per process in the period in which no abnormality is detected and determining, when the rate of increase is larger than or equal to a specified value, that the process time has increased by the specified value or more.

8. The computer-readable, non-transitory medium according to claim 1, wherein, in the determining the presence/absence of the cause-and-effect relationship, a correlation coefficient for a correlation between the time-series change in the average process time per process of the server belonging to the first tier and the time-series change in the average process time per process of the server belonging to the second tier is calculated, and when the correlation coefficient is larger than or equal to a specified significant level, it is determined that a correlation is present between the time-series changes.

9. The computer-readable, non-transitory medium according to claim 5, the procedure further comprising:
determining that, when the average process time per process belonging to a first type in an upper one of the first tier and the second tier has increased by a specified value or more and the average process time per process belonging to a second type and a third type has not increased by the specified amount or more, the increase in the process time in the upper tier is caused by an influence of the increase in the process time in the lower tier.

10. The computer-readable, non-transitory medium according to claim 1, wherein in the procedure of calculating the time-series changes of the average process times, the transaction information regarding the transaction performed in a period in which the process load in the multi-tier system is larger than a specified value is excluded from the transaction information stored in the storage unit and the time-series change in the average process time per process is calculated.

11. The computer-readable, non-transitory medium according to claim 10, wherein in the procedure of calculating the time-series changes in the average process times, the transaction information regarding the transaction performed in a period in which a process load that is larger than a process load in a period in which a standard deviation of the average process times is largest is excluded from the transaction information stored in the storage unit and the time-series change in the average process time per process is calculated.

12. An analyzing method executed by a computer, the method comprising:
calculating a time-series change in an average process time per process of a server belonging to a first tier of a plurality of tiers and a time-series change in an average process time per process of a server belonging to a second tier of the plurality of tiers, referring to a storage unit that stores, with respect to each transaction executed in a multi-tier system in which a plurality of servers coordinate with each other to execute the transaction, information indicating periods in which the server in each of the plurality of tiers executes processes for the transaction; and
determining the presence/absence of a correlation between the time-series change in the average process time of the server belonging to the first tier and the time-series change in the average process time of the server belonging to the second tier.

13. An analyzing apparatus comprising:
a processing-time analyzing unit configured to refer to a storage unit that stores, with respect to each transaction executed in a multi-tier system in which a plurality of servers coordinate with each other to execute the transaction, information indicating periods in which the server in each of a plurality of tiers executes processes for the transaction and to calculate a time-series change in an average process time per process of the server belonging to a first tier of the plurality of tiers and a time-series change in an average process time per process of the server belonging to a second tier of the plurality of tiers; and
a correlation determining unit configured to determine the presence/absence of a correlation between the time-series change in the average process time of the server belonging to the first tier and the time-series change in the average process time of the server belonging to the second tier.

14. An analyzing apparatus comprising:
a memory configured to store, with respect to each transaction executed in a multi-tier system in which a plurality of servers coordinate with each other to execute the transaction, information indicating periods in which the server in each of a plurality of tiers executes processes for the transaction; and
a processor configured to execute a procedure, the procedure comprising:

calculating, by referring to the memory, a time-series change in an average process time per process of the server belonging to a first tier of the plurality of tiers and a time-series change in an average process time per process of the server belonging to a second tier of the plurality of tiers; and determining the presence/absence of a correlation between the time-series change in the average process time of the server belonging to the first tier and the time-series change in the average process time of the server belonging to the second tier.

* * * * *